United States Patent Office 3,242,386
Patented Mar. 22, 1966

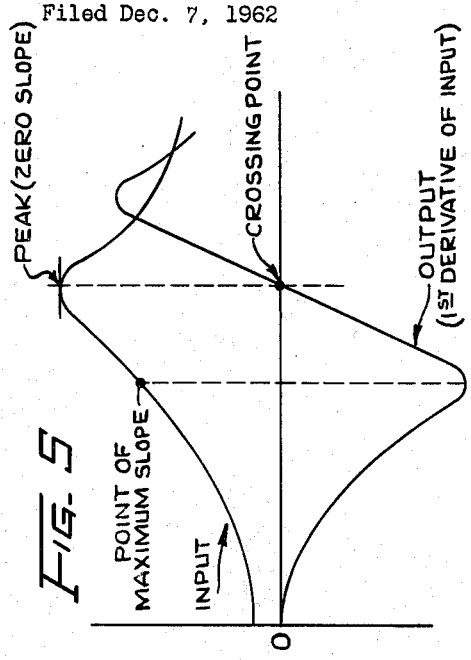
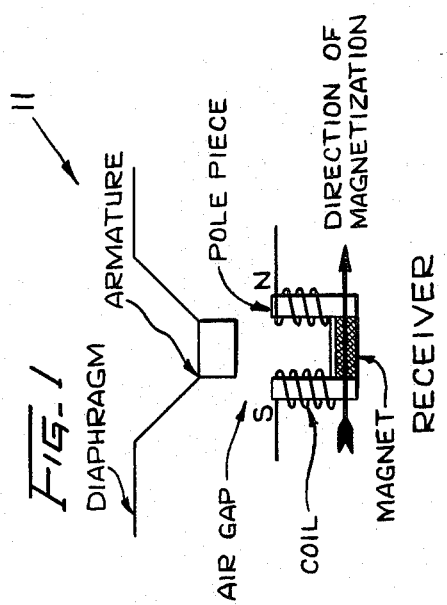
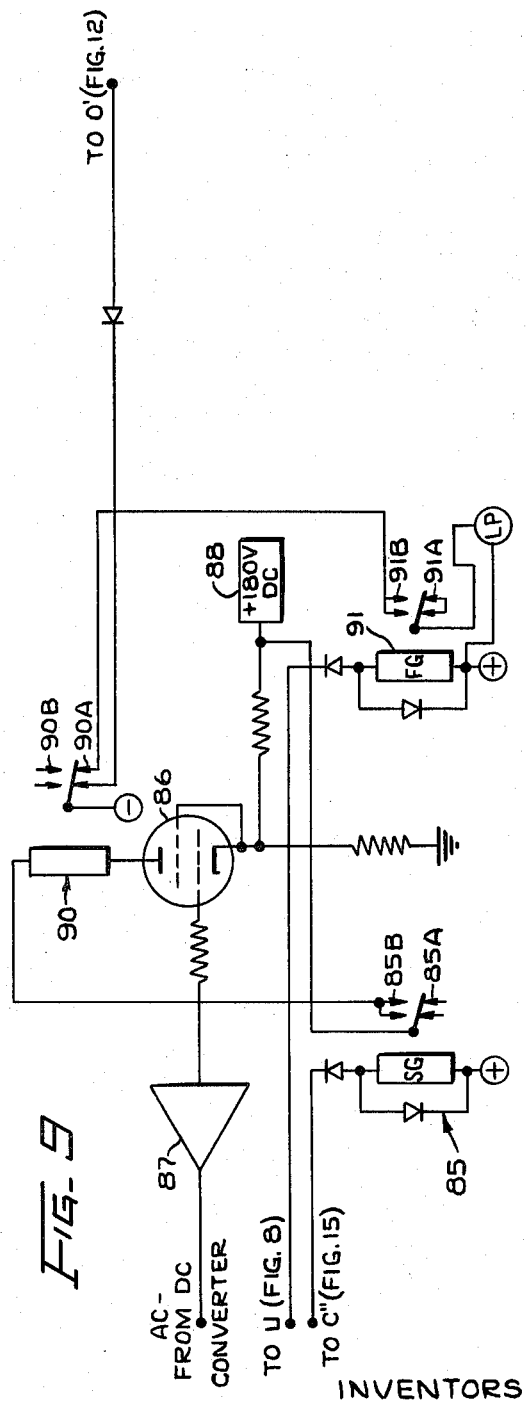
INVENTORS
J. P. AVERY
W. E. HOSTETLER
ATTORNEY

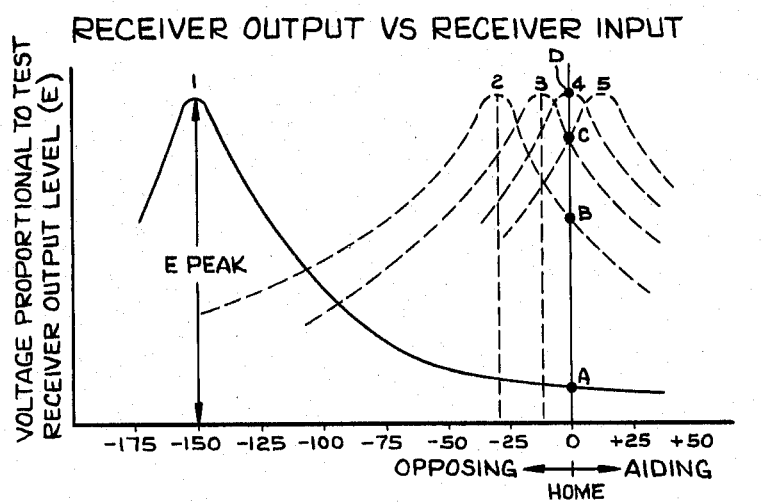
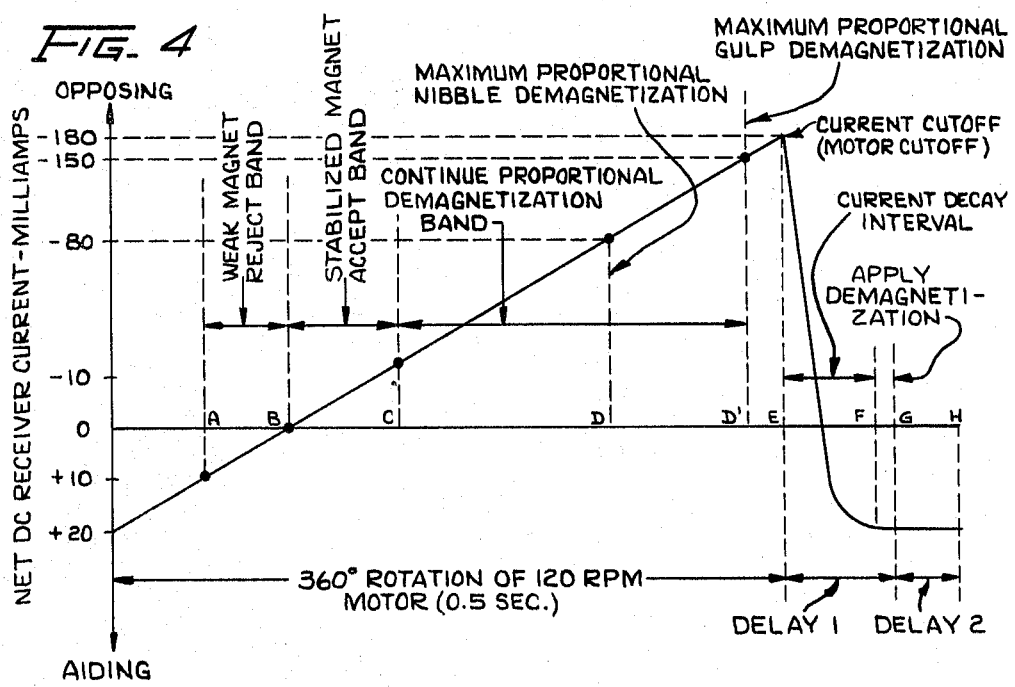

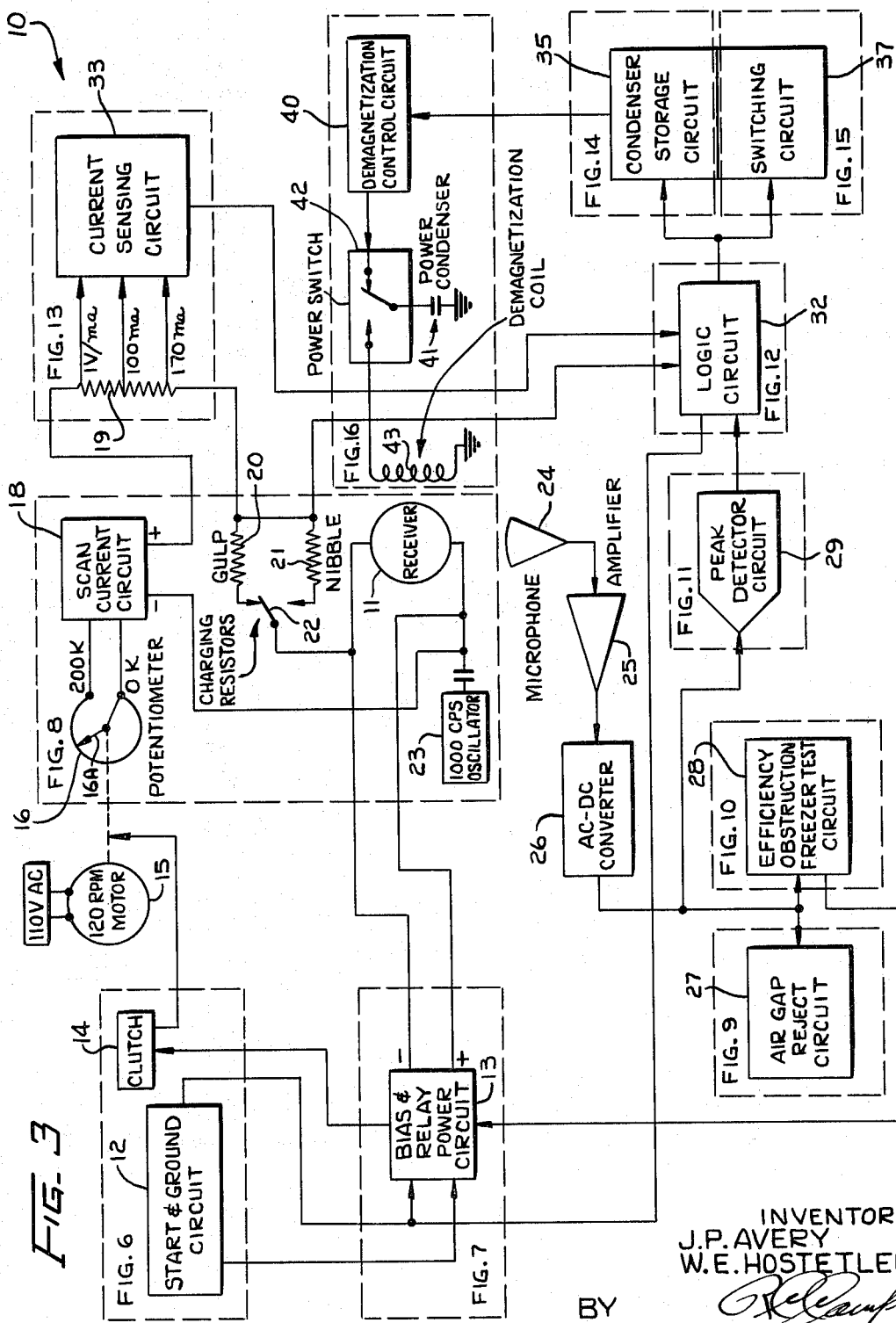

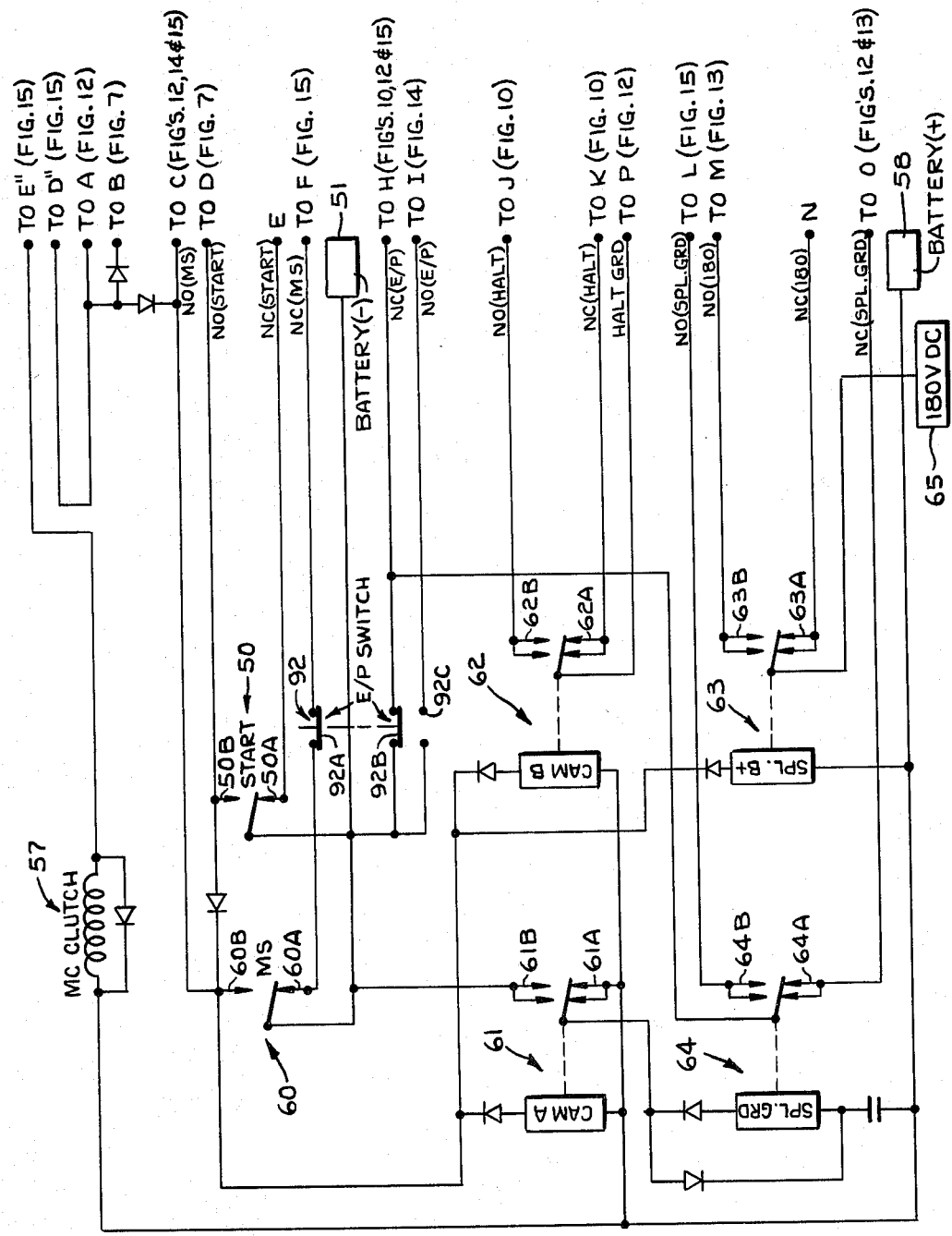

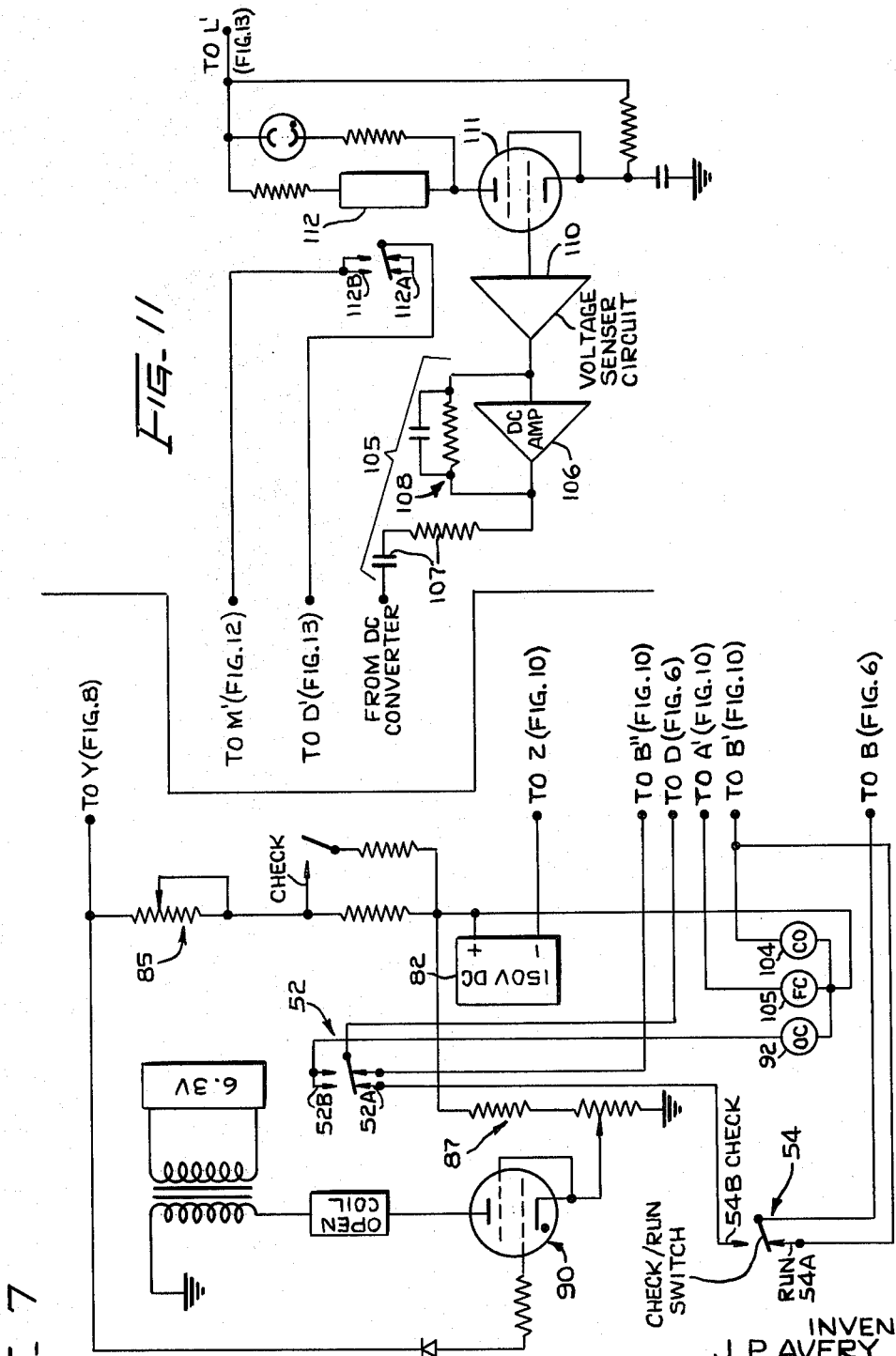

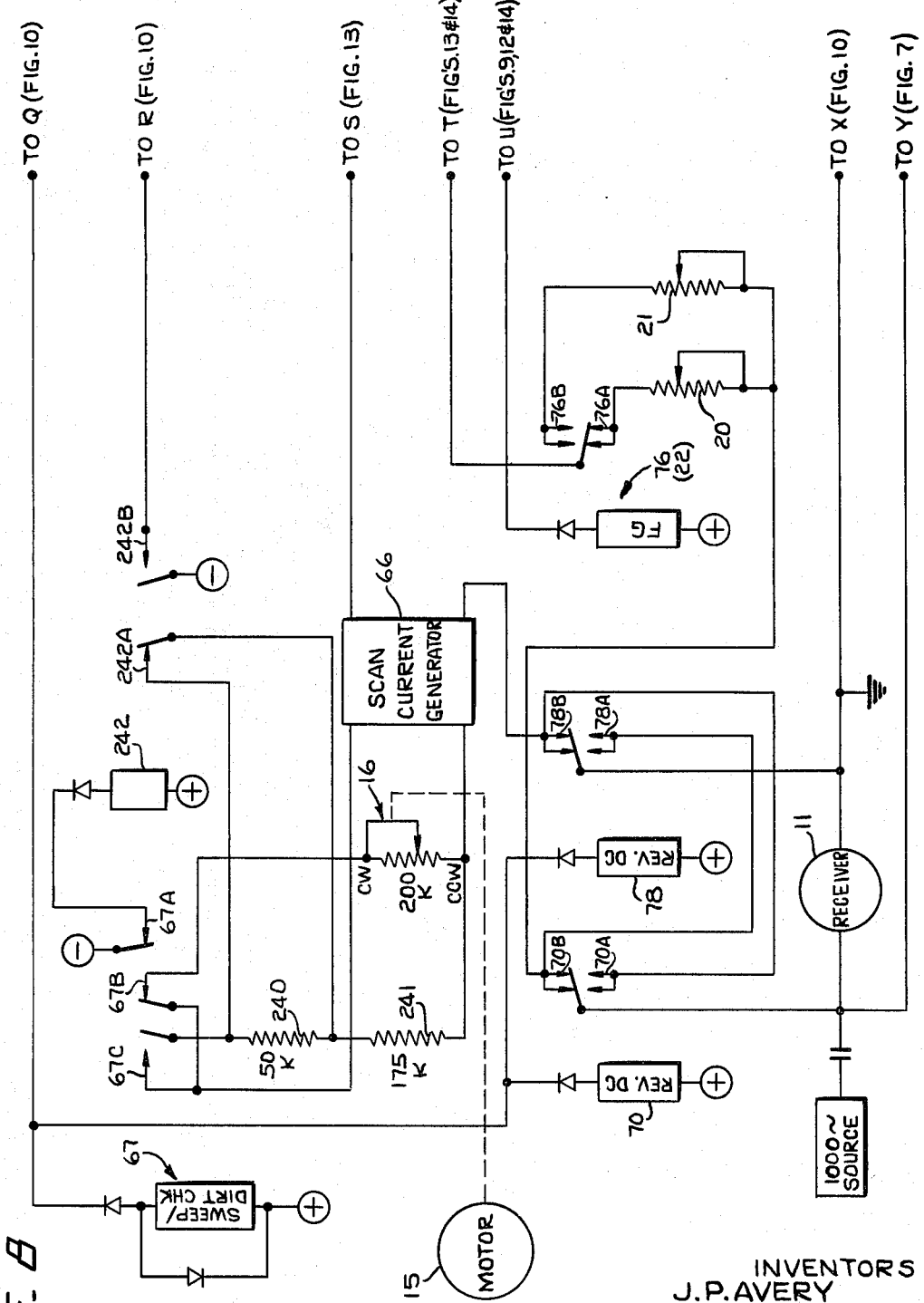

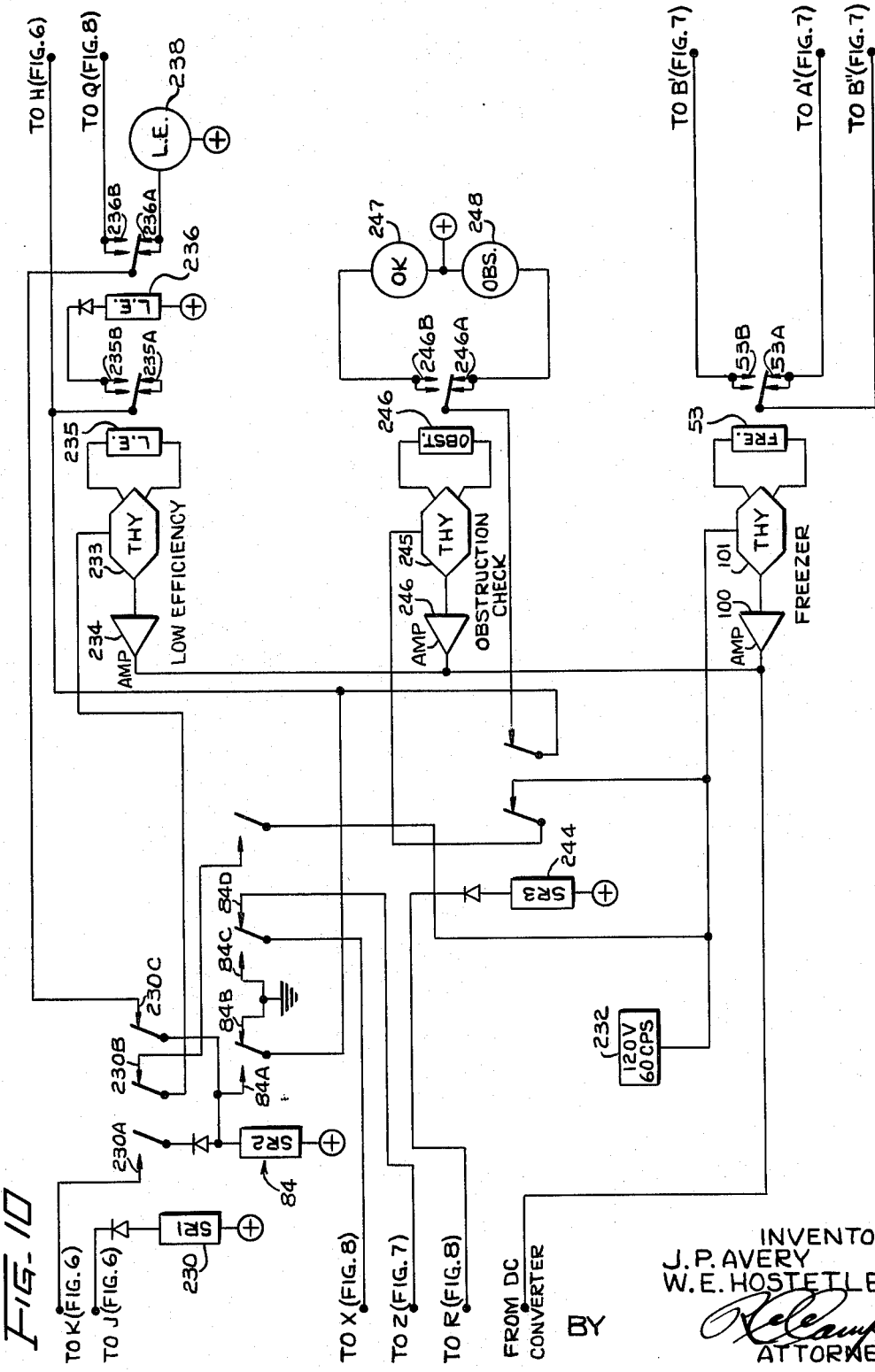

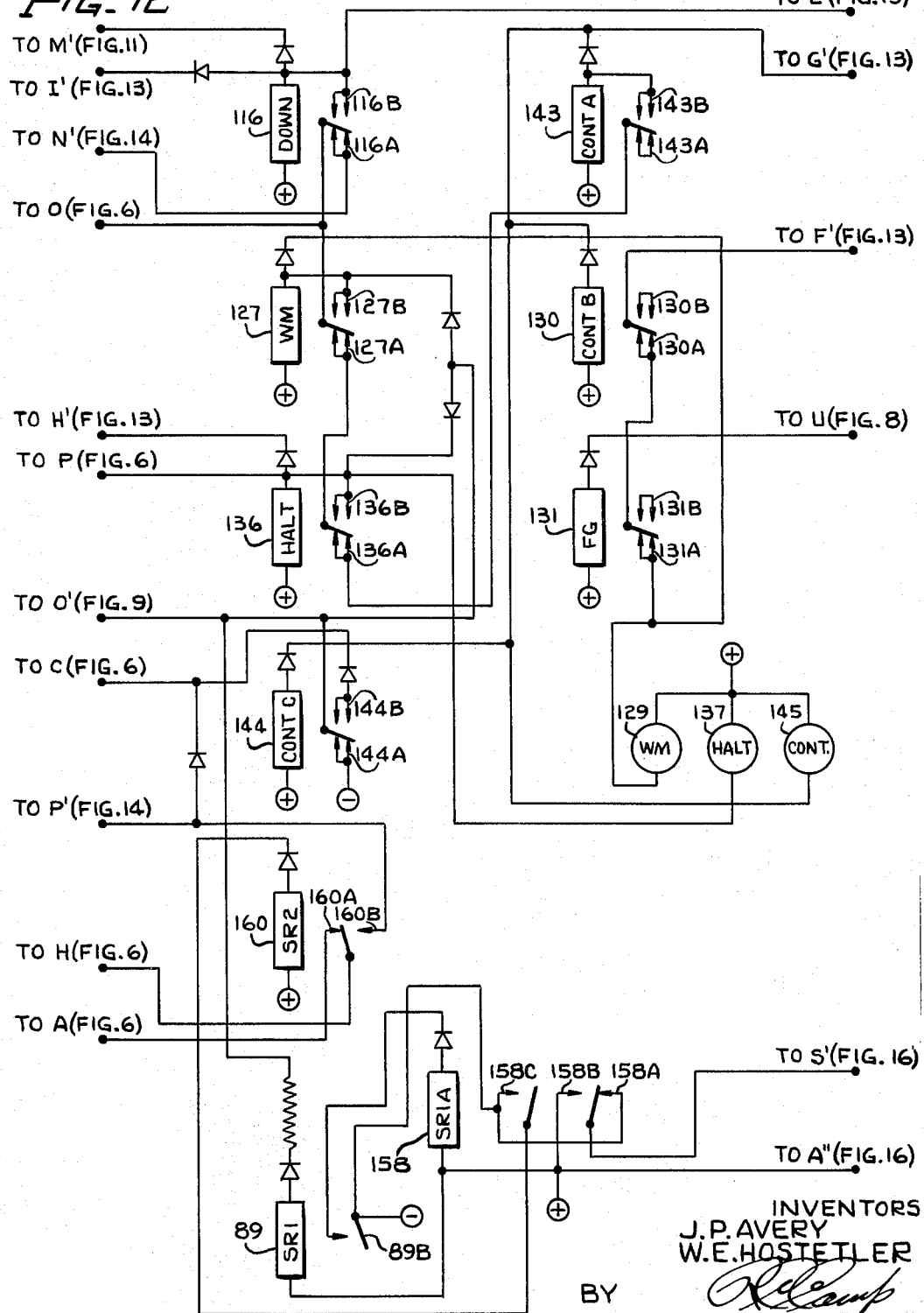

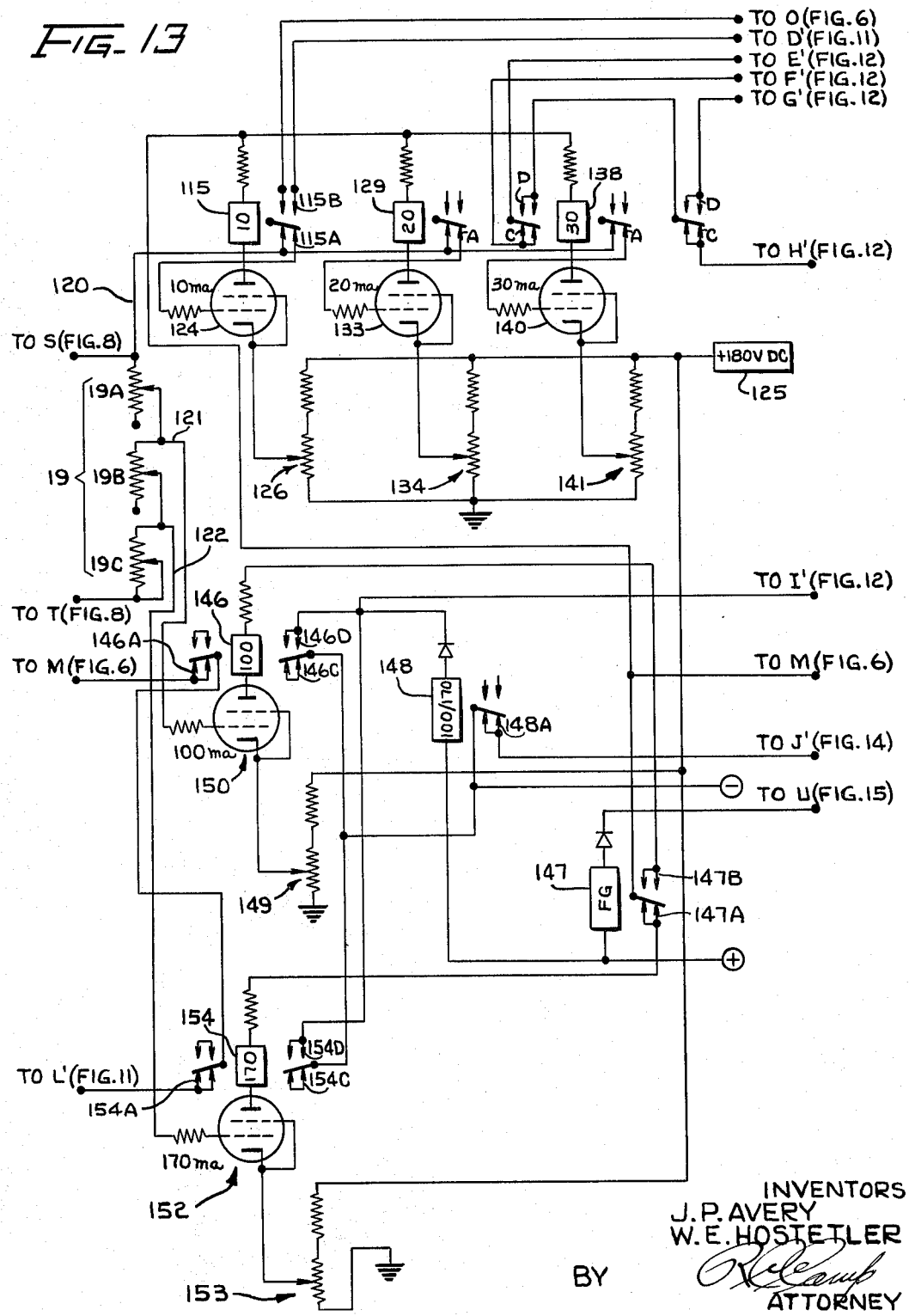

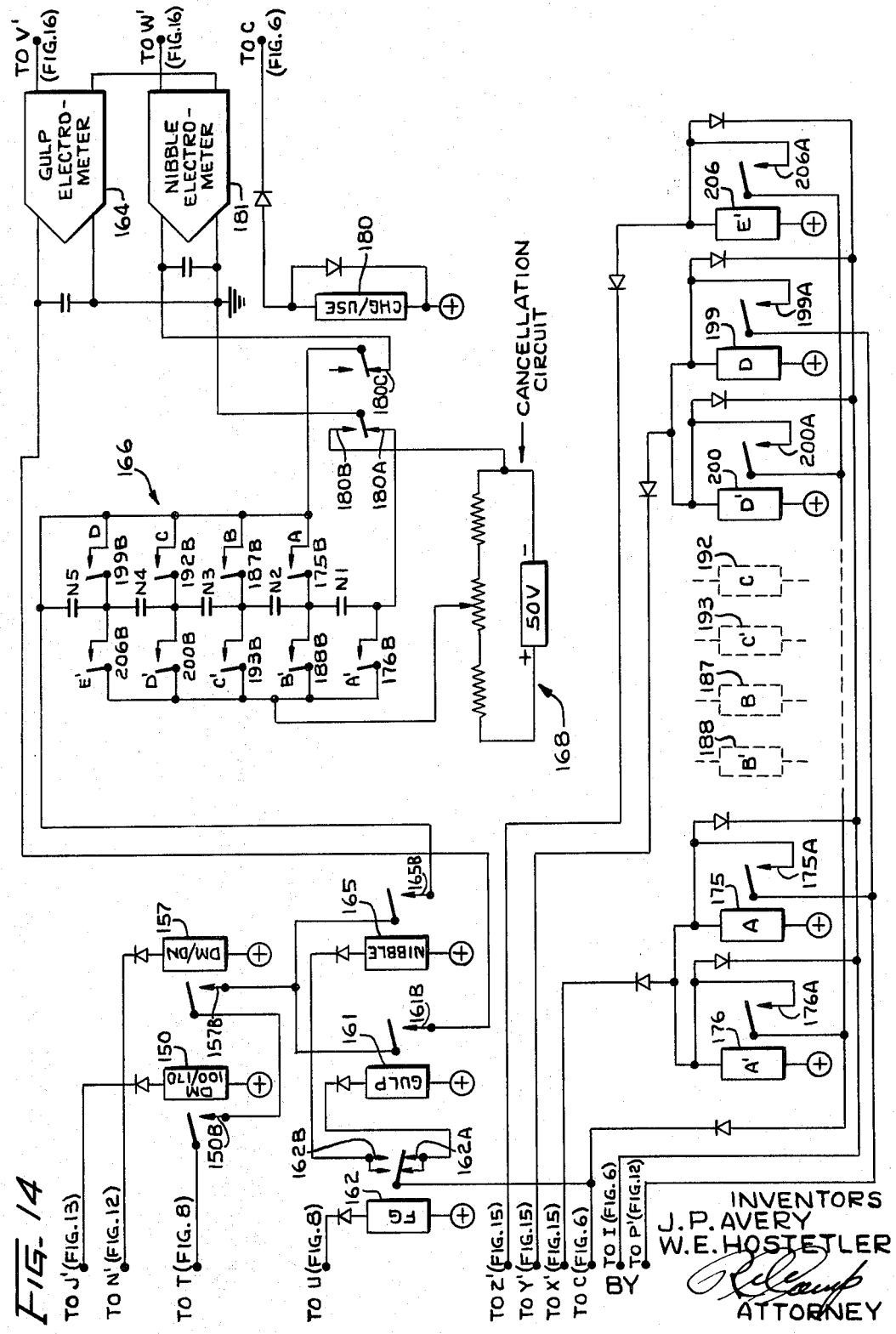

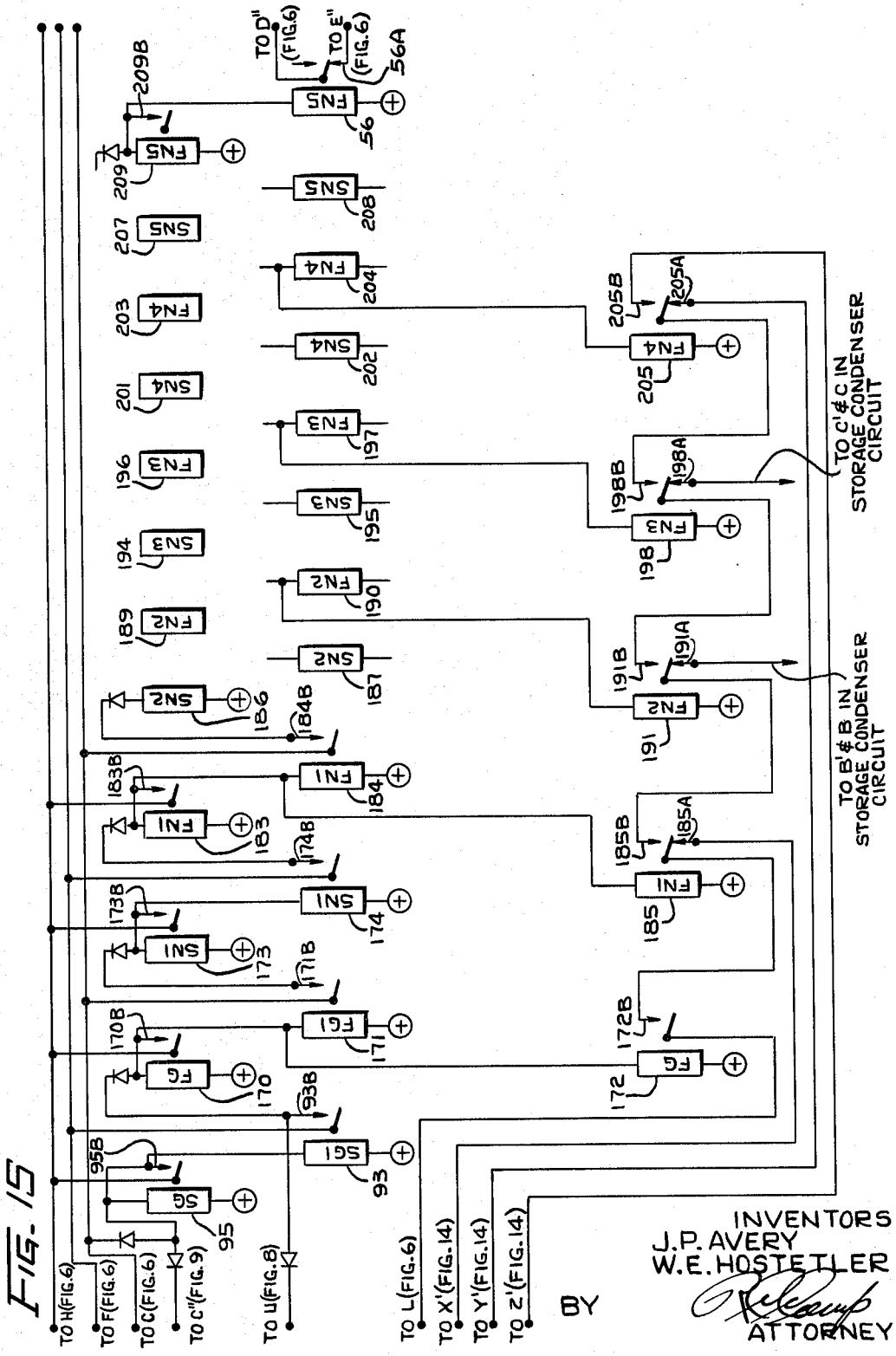

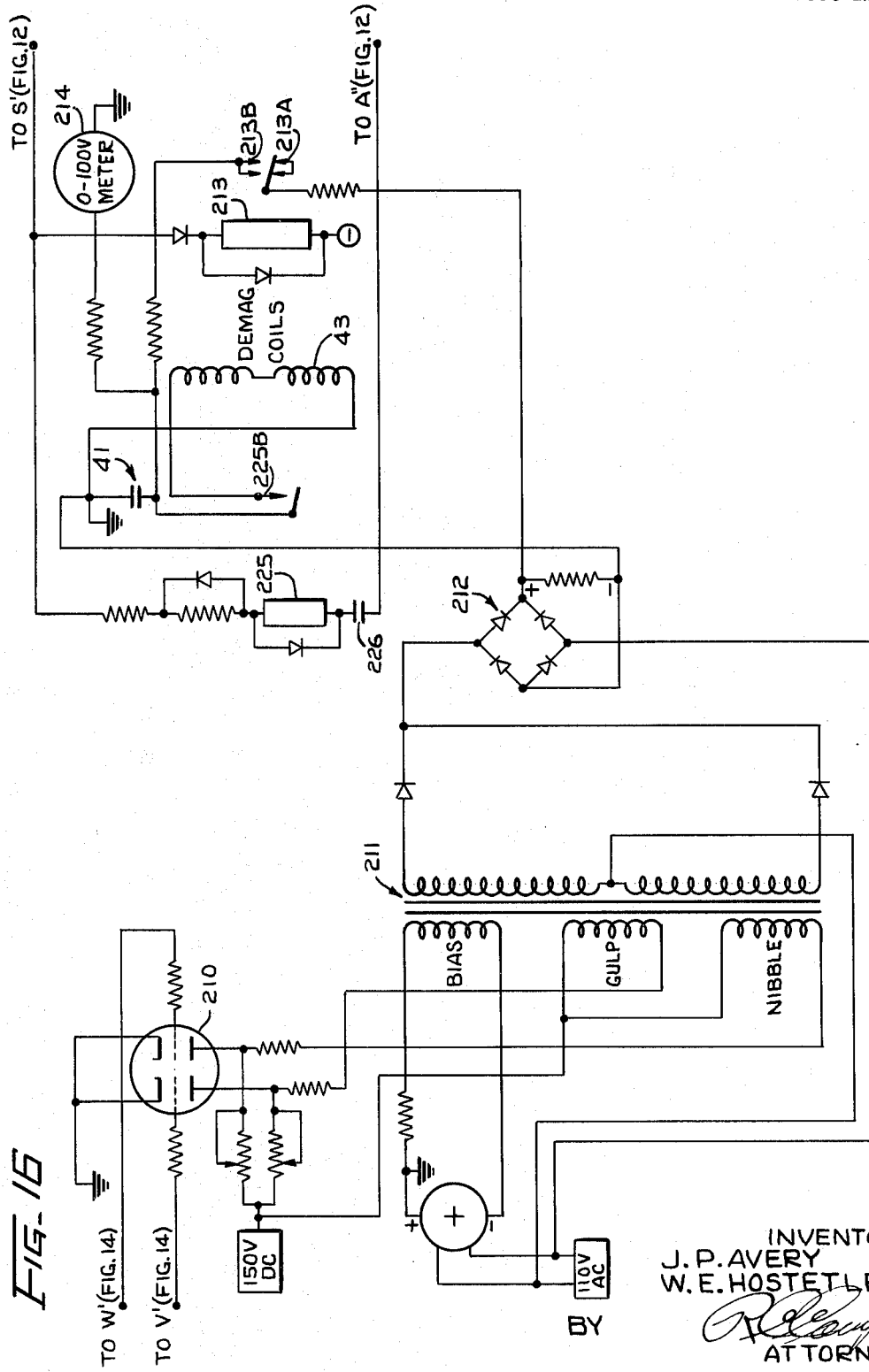

3,242,386
MAGNET STABILIZING METHOD AND APPARATUS
John P. Avery and Willard E. Hostetler, Indianapolis, Ind.; said Avery assignor to Western Electric Company, Incorporated, New York, N.Y., and said Hostetler assignor to Bell Telephone Laboratories, Incorporated, New York, N.Y., both corporations of New York
Filed Dec. 7, 1962, Ser. No. 243,104
12 Claims. (Cl. 317—123)

This invention relates to methods and apparatus for stabilizing the magnet of an electromagnetic device, and more particularly to methods and apparatus for conditioning acoustic devices for optimum performance. Objects of this invention are to provide new and improved methods and apparatus of such character.

In the conditioning of acoustic devices (such as telephone receivers) for operation, magnets of the acoustic devices are commonly magnetized to saturation and then are demagnetized (stabilized) to a point of optimum magnetization at which a maximum acoustic output may be produced. Another object of this invention is to provide new and improved apparatus for thus stabilizing a saturated magnet of an acoustic device automatically.

A further object of the invention is to provide an improved method and apparatus for altering the magnetization of the permanent magnet of an electromagnetic device in accordance with the value of a D.C. test signal which must be applied to the device to produce optimum response to an applied A.C. signal.

It is another object of the invention to provide an improved method and apparatus of the character specified above wherein the magnetization altering force to which the magnet is subjected is of lesser magnitude than a predicted value for complete stabilization of the magnet, and the operation is repeated until the D.C. test signal which is required to produce optimum output of the device is sufficiently small that it falls within desired limits.

It is a further object of the invention to provide improved apparatus of the character specified above wherein provision is made for storing, between successive operations, a value corresponding to the magnitude of the last preceding magnetization altering force and for adding to such value during succeeding operations in order that successive magnetization altering forces may readily be made of succesively greater magnitude.

A further object of the invention is to provide improved apparatus of the character specified above wherein improved apparatus is provided for recording the value of the D.C. test signal which corresponds to the maximum output of the device.

It is still another object of the invention to provide improved apparatus for detecting the occurrence of the peak value of a signal of varying magnitude.

A still further object of the invention is to provide an improved method and apparatus having various of the characteristics specified above while being inherently reliable in operation and simple and inexpensive to manufacture.

In accordance with a preferred embodiment of the invention, the magnet of an electromagnetic device is concurrently subjected to an A.C. induced field and a D.C. induced field of varying magnitude. The output signal thus derived from the device is monitored, and the strength of the D.C. induced field corresponding to the maximum value of the output signal is recorded. The magnet is then subjected to a magnetization altering force whose magnitude is governed by the recorded strength of the D.C. induced field.

Preferably, the magnetization altering force to which the magnet is subjected is of lesser value than the predictable value to completely stabilize the magnet. The operation is then repeated until the strength of the D.C. induced field which is required to produce maximum output of the device is sufficiently small that it falls within desired limits.

Other objects, advantages, and features of the invention will become apparent by reference to the following detailed description of certain specific embodiments thereof, when read in conjunction with the accompanying drawings, wherein:

FIG. 1 is an exploded cut-away side view of a receiver which is to be conditioned for operation;

FIG. 2 is a graph illustrating output versus input for the receiver illustrated in FIG. 1;

FIG. 3 is a block diagram of a stabilizing circuit for conditioning the receiver illustrated in FIG. 1 for operation;

FIG. 4 is a graph of a net D.C. signal applied to the input coil of the receiver of FIG. 1, along with an audio frequency signal;

FIG. 5 is a graph illustrating input versus output for a peak detector circuit which is included in the stabilizing circuit illustrated in block form in FIG. 3;

FIG. 6 is a schematic diagram illustrating the detailed connections of the components of a start and ground circuit illustrated as block 12 in the block diagram of FIG. 3;

FIG. 7 is a schematic diagram illustrating the detailed interconnections of the components of a bias and relay power circuit illustrated as block 13 in FIG. 3;

FIG. 8 is a schematic diagram illustrating the detailed interconnections of the components of a scan current circuit illustrated as block 18 in FIG. 3;

FIG. 9 is a schematic diagram illustrating the detailed interconnections of the components of an air gap reject circuit illustrated as block 27 in FIG. 3;

FIG. 10 is a schematic diagram illustrating the detailed interconnections of the components of an efficiency-obstruction-freezer test circuit illustrated as block 28 in FIG. 3;

FIG. 11 is a schematic diagram illustrating the detailed interconnections of the components of a peak detector circuit illustrated as block 29 in FIG. 3;

FIG. 12 is a schematic diagram illustrating the detailed interconections between the components of a logic circuit illustrated as block 32 in FIG. 3;

FIG. 13 is a schematic diagram illustrating the detailed interconnections of the components of a current sensing circuit illustrated as block 33 in FIG. 3;

FIG. 14 is a schematic diagram of the detailed interconnections between the components of a condenser storage circuit illustrated as block 35 in FIG. 3;

FIG. 15 is a schematic diagram illustrating the detailed interconnections between the components of a switching circuit illustrated as block 37 in FIG. 3; and FIG. 16 is a schematic diagram illustrating the detailed interconnections between the components of a demagnetization control circuit, a power condenser, and a demagnetization coil, designated by numbers 40, 41, and 43 in FIG. 3.

Referring now to the drawings and more specifically to FIG. 1, a receiver 11, which is to be stabilized is illustrated. The receiver 11 includes a diaphragm, an armature, a pair of pole pieces, a coil for receiving input signals, and a magnet which is initially magnetized to saturation. Each receiver, by virtue of its characteristics, has an optimum magnetization which enables an applied A.C. signal of prescribed value to produce a maximum acoustic output. Referring to FIG. 2, optimum magnetization is indicated by a peak in the receiver acoustic output level when a linearly varying D.C. signal, which opposes the fixed magnetization of the magnet, is applied to the coil of the receiver 11 along with a 1000 cycle signal of prescribed magnitude. For purposes of this description, the magnet of the receiver 11 is assumed to be saturated in the positive direction, and therefore, the opposing D.C. signal is a signal having a negative value.

For receivers to be used in telephone sets, the peak acoustic output must occur when an opposing D.C. signal, superimposed on a 1000 c.p.s. signal, has a value within the range of −10 ma. to 0 ma., which is indicative of a stabilized receiver magnet. Receivers are not acceptable for use in telephone sets if the peak acoustic output occurs when a positive or aiding D.C. signal is superimposed on the 1000 cycle signal, the magnets of such receivers being considered weak magnets. If the peak acoustic output of the receiver occurs when an opposing D.C. signal greater in value than −10 ma. is superimposed on a 1000 c.p.s. signal, the magnet of the receiver must be permanently demagnetized until the peak occurs when the opposing D.C. signal falls within the acceptance range of −10 ma. to 0 ma. The amount of demagnetization required to stabilize the magnet of a receiver 11 is proportional to the magnitude of the opposing D.C. signal which is required in order to produce the peak acoustic output. In accordance with the present invention the magnets are demagnetized in incremental steps until the peak acoustic output occurs when the value of the opposing D.C. signal falls within the acceptance range.

An automatic receiver stabilizing circuit 10 is illustrated in simplified block form in FIG. 3 and a receiver 11 is shown connected therein to be tested and stabilized. Operation of the circuit 10 is described below as applied to the stabilizing of receivers for telephone sets, although the circuit may be adapted for use in stabilizing magnets of electromagnetic devices to be used in any desired apparatus. For purposes of this description, the receiver magnet is assumed to have been previously saturated in the position direction.

In operation, a D.C. signal is superimopsed on a 1000 cycle signal which is applied to the coil of the receiver 11. The D.C. signal is cyclically swept through a range from +20 ma. (aiding current which induces a magnetizing field which aids the field of the saturated magnet) to −180 ma. (opposing current which counteracts the field of the saturated magnet). During each sweep of the D.C. signal the receiver output is monitored for a peak acoustic output point, as indicated by the D.C. Current vs. Receiver Output Level curve of FIG. 2.

The current which produces the D.C. signal passes through a charging resistor, and the voltage across the charging resistor is applied to a storage condenser until the peak acoustic output point is detected. The charge stored in the storage condenser is transformed into a power charge, without loss of the stored charge, and the power charge is applied to the receiver magnet by means of an external demagnetizing force to cause the magnet to be demagnetized in proportion to the stored charge. This cycle is repeated until the peak acoustic output occurs when the D.C. signal falls within the acceptance range, the power charge employed during successive cycle being derived from the summation of the stored charges from all previous cycles. Two resistors are used as charging resistors so that the maximum charge that may be stored during the first cycle is equal to three times the maximum charge that may be stored during each subsequent cycle. Accordingly, the maximum demagnetizing force that may be provided during the first cycle (referred to as a "gulp" demagnetizing force) is equal to three times the maximum demagnetizing force which may be provided during subsequent cycles (referred to as a "nibble" demagnetizing force).

To initiate operation of the stabilizing circuit 10 illustrated in FIG. 3, a start switch within a start and ground circuit 12 is momentarily closed to apply an input signal through a bias circuit 13 to an input coil of clutch 14. If an open circuit condition exists in the coil of the receiver 11, a thyratron-relay circuit within the bias circuit 13 operates to prevent transmission of the input signal from the start and ground circuit 12 to the input coil of the clutch 14, so that further operation of the stabilizing circuit 10 is prevented. In this event, the faulty receiver is removed from the stabilizing circuit 10 and a new receiver 11 is connected therein to be tested and stabilized.

The clutch 14 responds to the application of an input signal to its input coil to connect the shaft of a motor 15 to the connector arm 16A of a servo-potentiometer 16, which has a resistance range of 0 to 200,000 ohms, so that the potentiometer 16 may be swept through its range during each cycle of operation of the stabilizing circuit 10. The potentiometer 16 governs to a scan current circuit 18 which provides a 1 ma. (milliampere) D.C. signal for each 1000 ohms connected thereto. A D.C. signal is, therefore, provided by the scan current circuit 18 which sweeps linearly through a range of 0 ma. to 200 ma. as the potentiometer is moved through its range.

The output of the scan current circuit 18 is connected through a coil sensing resistor 19 and either a gulp charging resistor 20 or a nibble charging resistor 21 (depending upon the positioning of a switch 22) to the coil of the receiver 11 so that the D.C. signal is applied to the receiver coil to induce a magnetic field which opposes the field of the receiver magnet. The previously mentioned bias circuit 13 is also connected to the coil of the receiver 11 and applies a constant 20 ma. D.C. signal thereto which induces a magnetic field that aids the field of the receiver magnet. Thus a resultant D.C. sweep signal (illustrated in FIG. 4) is applied to the coil of the receiver 11 which sweeps through a range of +20 ma. (aiding current) to −180 ma. (opposing current) as the potentiometer 16 is moved through its range.

A 1000 cycle signal is also applied to the coil of the receiver 11 by a 1000 cycle oscillator 23.

The resulting output of the receiver is picked up by a microphone 24 positioned adjacent the receiver 11. The output of the microphone 24 is amplified by an amplifier 25 and transmitted to an A.C.-D.C. converter 26 which consists of a full wave bridge rectifier followed by a four-stage L/C filter driving a dual cathode follower. An output signal such as that illustrated in FIG. 2 is provided by the A.C.-D.C. converter as the resultant D.C. sweep signal applied to the coil of the receiver 11 sweeps through its range. The output of the A.C.-D.C. converter 26 is transmitted to an air gap reject circuit 27, to an efficiency-obstruction-freezer test circuit 28, and to a peak detector circuit 29.

The air gap reject circuit 27 is provided to detect the peak db output level of the receiver output during the first cycle of the stabilizing circuit operation. If the receiver output fails to reach a predetermined db level (72 db in the illustrated embodiment) during the first cycle of operation of the stabilizing circuit 10, the air gap reject circuit 27 operates to prevent subsequent cycling of the stabilizing circuit 10. The receiver 11 failing to pass the air gap test is then removed from the stabilizing circuit 10, a new receiver is substituted therefor, and a subsequent test may be started.

The efficiency-obstruction-freezer test circuit 28 is provided to test the receiver 11 for three possible faults: (1) a freezer condition during each cycle of operation of the stabilizing circuit (receiver diaphragm touching the pole pieces), (2) low efficiency after the receiver 11 has been stabilized (low ratio of receiver output to receiver input), and (3) an obstruction after the low efficiency test has been performed (dirt or other foreign particles present in the receiver air gap).

In response to the application thereto of the A.C.-D.C. converter output signal, circuitry within the peak detector circuit 29 provides an output signal which is the first derivative of the A.C.-D.C. converter output signal as illustrated in FIG. 5. Additional circuitry within the peak detector circuit provides a peak indicating output signal when the first derivative output signal changes from one polarity to the other polarity. As may be seen in FIG. 5, the first derivative output signal changes from a negative value to a positive value as the receiver acoustic output signal passes through its peak value since the A.C.-D.C. converter output signal is directly proportional to the receiver acoustic output. The peak indicating output signal thus obtained is transmitted to a logic circuit 32 to cause operation thereof as set forth below.

A current sensing circuit 33 is connected to the current sensing resistor 19 to monitor the sweep D.C. signal provided by the scan current circuit 18, and provides output signals which are indicative of that signal attaining values of −10 ma., −20 ma., −30 ma., −100 ma., and −170 ma., these values corresponding to resultant D.C. sweep signal values of +10 ma., 0 ma., −10 ma., −80 ma., and −150 ma. In the interest of simplicity, subsequent reference to D.C. sweep signal current values are expressed in terms of the corresponding resultant values, i.e. the value of the basic sweep signal plus the fixed bias of +20 ma. The output signals provided by the current sensing circuit 33 are transmitted to the logic circuit 32 to cause operation thereof as set forth below.

A condenser storage circuit 35 is so connected through the logic 32 to the previously mentioned gulp and nibble charging resistors 20 and 21 that a charge is stored which is proportional to the instantaneous voltage drop across the resistor 20 or 21 connected in series with the scan current circuit 18. The instantaneous voltage drop across the charging resistor 20 or 21 associated with the scan current circuit 18 is proportional to the instantaneous value of the D.C. sweep signal provided by the scan current circuit 18.

During the first cycle of operation of the stabilizing circuit 10, the previously mentioned switch 22 is positioned so that the gulp resistor 20 is connected in series with the scan current circuit 18, and a switching circuit 37 responds to the completion of operation of the first cycle of the stabilizing circuit 10 to operate the switch 22 so that during subsequent cycles of operation the nibble resistor 21 is connected in series with the scan current circuit 18. The gulp resistor 20 has a value which is three times the value of the nibble resistor so that the maximum charge that may be stored in the condenser storage circuit 35 during the first cycle of operation is equal to three times the maximum charge that may be stored during subsequent cycles.

Circuitry is included in the condenser storage circuit 35 which prevents storing of a charge during each cycle until the opposing D.C. sweep signal reaches a value of 0 ma. (i.e. a value corresponding to a resultant value of 0 ma.) which is the beginning of the stabilized magnet acceptance range.

The logic circuit 32 responds to a peak indicating output signal to open circuit the connection between the condenser storage circuit 35 and the charging resistor 20 or 21 so that the charge stored in the condenser storage circuit 35 during each cycle of operation is proportional to the instantaneous voltage drop across the associated charging resistor 20 or 21 when a peak acoustic output of the receiver is detected (indicated by the peak indicating output signal). The charge stored in the condenser storage circuit 35 during each cycle of operation after the first is added to the charge stored during the preceding cycles by operation of the switching circuit 37 so that the instantaneous charge stored is the cumulative value of the charge stored during all the cycles of operation.

Referring again to FIG. 4, if the peak indicating output signal occurs between the time that output signals transmitted from the current sensing circuit 33 are indicative of opposing D.C. sweep signals corresponding to resultant values of +10 ma. and 0 ma., as indicated by points A and B in FIG. 4, the logic circuit 32 operates to stop operation of the stabilizing circuit 10 and to indicate a weak receiver magnet condition. The faulty receiver is then removed from the stabilizing circuit 10 and a new receiver to be tested is connected therein so that a subsequent testing operation may be started.

If the peak indicating output signal occurs between the time that output signals transmitted from the current sensing circuit 33 are indicative of opposing D.C. sweep signals corresponding to resultant values of 0 ma. and a −10 ma. as indicated by points B and C in FIG. 4, the logic circuit 32 operates to stop operation of the stabilizing circuit 10 and to indicate a stabilized receiver magnet condition. The low efficiency and obstruction tests are then performed on the receiver 11 by the efficiency-obstruction-freezer test circuit 28 as previously set forth and the receiver 11 is removed from the stabilizing circuit 10. A new receiver to be tested is then connected in the stabilizing circuit 10 so that a subsequent testing operation may be started.

If the receiver under test does not exhibit a weak magnetic condition and if it does not fall initially within the acceptance range, it is repeatedly subjected to demagnetizing pulses of selected magnitude to bring the magnet strength to approximately optimum value. Three situations may occur, in any of which events the logic circuit 32 continues testing and demagnetizing operations:

(1) A peak indicating output signal may occur subsequent to the time that the signal transmitted from the current sensing circuit 33 indicates an opposing D.C. sweep signal corresponding to a resultant value of a −10 ma., as indicated by point C in FIG. 4.

(2) The peak indicating output signal may not be reached during the first cycle, i.e. before the output signal transmitted from the current sensing circuit 33 indicates an opposing D.C. sweep signal corresponding to the maximum resultant value of −150 ma., as indicated by point D′ in FIG. 4.

(3) The peak indicating output signal may not occur during three ensuing (nibble) cycles following the initial (gulp) cycle by the time that the output signal transmitted from the current sensing circuit 33 indicates an opposing D.C. sweep signal corresponding to the maximum resultant nibble cycle value of −80 ma., as indicated by point D in FIG. 4.

Following any of these three occurrences, the logic circuit 32 continues operation of the stabilizing circuit 10. The charge stored in the condenser storage circuit following a test cycle is applied through a demagnetization control circuit 40 to a power condenser 41 without significant loss of the stored charge in the condenser storage circuit 35. At the completion of a cycle (360° rotation of the motor 15 as indicated by point E in FIG. 4) and after a time delay to permit decay of the D.C. sweep signal (see FIG. 4), the demagnetization control circuit 41 operates a power switch 42 which connects the power condenser 40 to a demagnetization coil 43 associated with the magnet of the receiver 11. The power condenser 40 discharges through the demagnetization coil 43 so that a momentary electromagnetic field is induced which causes the magnet of the receiver 11 to be demagnetized in proportion to the charge stored in the condenser storage circuit 35 (this charge being proportional to the value of the resultant D.C. sweep signal at the time of the peak acoustic receiver output). After a second time delay (see FIG. 4) wherein the storage condensers already charged are disconnected and various relay reset functions are performed, the stabilizing circuit 10 is ready for another cycle of operation and the motor 15 is again operated.

As previously set forth, a gulp demagnetizing force is applied to the magnet of the receiver 11 during the first cycle of operation and a nibble demagnetizing force is applied thereto during each subsequent cycle of operation. Referring to FIG. 2, a peak acoustic output is indicated during the first cycle of operation when a resultant opposing D.C. signal having a value of −150 ma. is applied to the coil of the receiver 11 (point 1). The gulp demagnetization force is then applied to the magnet of the receiver 11 which demagnetizes the magnet approximately 80% so that during the second cycle of operation the peak acoustic output occurs when a resultant opposing D.C. signal having a value of a −30 ma. is applied to the coil of the receiver 11 (point 2). A nibble demagnetization force is then applied to the magnet of the receiver 11 which demagnetizes the magnet approximately 80% so that during the next cycle of operation the peak acoustic output occurs when a resultant opposing D.C. signal having a value of 6 ma. is applied to the coil of the receiver 11 (point 3), which is within the acceptance range. Point 4 indicates an optimum condition wherein the peak acoustic output occurs when no resultant opposing D.C. signal is applied to the coil of the receiver 11. Point 5 indicates weak magnet condition of a receiver which must be rejected. In the illustrated embodiment, if a magnet of a receiver has not been stabilized after one gulp cycle and five nibble cycles, the receiver is rejected as being unsatisfactory and a new receiver is connected in the stabilizing circuit 10 to be stabilized.

The operation of the stabilizing circuit 10 will now be set forth in detail as illustrated in FIGS. 6 to 16. Referring to FIG. 6, operation of the stabilizing circuit 10 is initiated by momentary movement of the contact arm of a start switch 50 from engagement with the primary contact 50A into engagement with the secondary contact 50B so that a negative signal is transmitted from a battery source 51 to terminal D.

Terminal D in FIG. 6 is connected to terminal D in FIG. 7 so that the negative signal is transmitted through a normally closed contact 52A of an open coil relay 52 to terminal B″. Terminal B″ is connected to terminal B″ in FIG. 10 so that the negative signal is transmitted through a normally open contact 53B of a freezer relay 53 to terminal B′. Terminal B′ is connected to terminal B′ in FIG. 7 so that the negative signal is transmitted through a run contact 54A of a check run switch 54 to terminal B.

Terminal B in FIG. 7 is connected to terminal 13 in FIG. 6 and hence to terminal D in FIG. 6. Accordingly, the negative signal is transmitted to terminal D″ in FIG. 15 and through a normally closed contact 56A of a finish nibble relay 56 to terminal E″. Terminal E″ is connected to terminal E″ in FIG. 6 so that a negative signal is applied to one side of clutch coil 57. If the freezer relay 53 operates to move its contact arm into engagement with its normally open contacts 53A, the clutch coil 57 is energized since the other end thereof is connected to a battery source 58 which provides a positive signal.

In response to energization of the clutch coil, the clutch 14 (FIG. 3) operates to couple the shaft of the motor 15 to the contact arm 16A of the potentiometer 16. As the motor operates, a cam (not shown) operates to move the contact arm of a cam operated microswitch 60 into engagement with its normaly open contact 60B so that the negative signal is applied to one side of a cam A relay 61, a cam B relay 62, and a special B+ relay 63. The relays 61, 62 and 63 operate since the other ends thereof are connected to the battery source 58. In response to operation of the cam A relay 61, the negative signal is applied to one side of a special ground relay 64 and momentarily causes operation thereof since the other side of the relay is connected to the battery source 58.

In response to operation of the cam B relay 62, terminal P is disconnected from terminal K and is connected to terminal J. The battery source 51 is disconnected from terminal O and is connected to terminal L. In response to operation of the special B+ relay 63, a 180 volt D.C. signal provided by a D.C. source 65 is disconnected from terminal N and is connected to terminal M.

The cam B relay 62 is provided to aid in controlling (1) the stopping of operation of the stabilizing circuit 10 when a stabilized receiver magnet is indicated, (2) the stopping of operation of the stabilizing circuit 10 when a weak receiver magnet is indicated, and (3) the operation of the efficiency-obstruction-freezer test circuit 28 (FIGS. 3 and 10). The special B+ relay 63 is provided to condition the current sensing circuit 33 (FIGS. 3 and 13) for operation by causing a positive 180 volt D.C. signal to be transmitted thereto. The operation ground relay 64 is provided to control the resetting of relays in the logic circuit 32 (FIGS. 3 and 12) and to control the operation of relays in the switching circuit 37 (FIGS. 3 and 15). The detailed operation in response to the energization of relays 62, 63 and 64 is described in detail below.

Referring to FIG. 8, the previously mentioned servo-potentiometer 16 has a resistance range of 0 ohms to 200,000 ohms and is connected across the input of a scan current generator 66 through a normally closed contact 67A of a sweep dirt check relay 67 (the operation of which is set forth below). As the motor 15 makes one complete revolution, the contact arm of the potentiometer 16 is linearly swept from 0 ohms to 200,000 ohms provided that the clutch coil 57 has been energized to connect the shaft of the motor 15 to the potentiometer contact arm. The scan current generator 66 is a conventional, commercial unit which provides a 1 ma. D.C. current signal at its output for every 1,000 ohms connected across its input. Thus, as the potentiometer is swept through its range, a D.C. sweep current signal having a range of 0 ma. to 200 ma. is provided at the output of the scan current generator 66.

The output of the scan current generator 66 is connected to the coil of the receiver 11 so that the sweep current signal is applied thereto. The sweep current signal induces a magnetic field which opposes the field of the magnet of the receiver 11, and, therefore, is considered as a negative current signal. One side of the output of the scan current generator 66 is connected to the receiver coil through the normally closed contact 70A of a reverse D.C. relay 70 (which operates during a sweep dirt check in the manner described below). The other side of the output of the scan current generator 66 is connected to the receiver coil through terminal S (FIG. 8), terminal S (FIG. 13), the previously mentioned current sensing resistor 19 (which consists of a series of variable resistors 19A, 19B and 19C), terminal T (FIG. 13), terminal T (FIG. 8), the normally closed contact 76A or the normally open contact 76B of a finish gulp relay 76, a variable gulp charging resistor 78 or a variable nibble charging resistor 79, and the normally closed contact 78A of a reverse D.C. relay 78 (which operates during the sweep dirt check as discussed hereinafter).

During the first cycle of operation of the stabilizing circuit 10 (gulp cycle), the finish gulp relay is not energized, and therefore, the output of the scan current generator is transmitted through the normally closed contact 76A of the finish gulp relay 76 and through the variable gulp charging resistor 78. During each cycle of operation subsequent to the first (nibble cycles), the finish gulp relay 76 is energized, and therefore, the output of the scan current generator is transmitted through the normally open contact 76B of the finish gulp relay 76 and through the variable nibble charging resistor 79.

Referring to FIG. 7, a 150 volt D.C. source 82 is also connected across the coil of the receiver 11 so that a 20 ma. constant D.C. bias current signal is applied thereto. The bias current signal induces a magnetic field that aids the field of the receiver magnet, and therefore, is considered as a positive current signal. One side of the D.C. source 82 is connected to the receiver coil through terminal Z (FIG. 7), terminal Z (FIG. 10), a normally closed contact 84D of an SR2 relay 84 (which operates as described below), terminal X (FIG. 10), and terminal X (FIG. 8). The other side of the D.C. source 82 is connected to the receiver coil through a variable resistor 85, terminal Y (FIG. 7), and terminal Y (FIG. 8). Thus, a re-resultant D.C. sweep current signal is applied to the receiver coil which is swept from +20 ma. to −180 ma. during each cycle of operation of the stabilizing circuit 10.

The previously mentioned 1,000 cycle oscillator 23 (FIG. 8) is also connected to the receiver coil so that a 1,000 cycle signal is applied thereto, and the resultant sweep current signal is superimposed thereon to cause an acoustic output to be induced in the microphone 24 (FIG. 3).

If the coil of the receiver 11 is open circuited, the resultant D.C. sweep signal is transmitted through the variable resistor 85 and a resistor 87 (FIG. 7) to ground. A thyratron 90 has its control grid connected to the terminal Y in FIG. 7, and its cathode tapped off the resistor 87, so that a sufficient voltage differential is developed between the cathode and the grid to cause the thyratron to conduct. When the thyratron conducts, the previously mentioned open circuit relay 52 is energized so that its contact arm is moved into engagement with its normally open contact 52A whereby the negative signal applied to terminal D is applied to an open circuit indicator light 92 to cause it to light up, and the connection between the negative signal source 51 and the clutch coil 57 is open circuited. Thus, the stabilizing circuit 10 ceases to operate since the clutch coil 57 only operates when a negative signal is applied thereto. The receiver with the open circuited coil may then be removed from the stabilizing circuit 10 and a new receiver is connected therein to be tested and stabilized.

The output of the microphone 24 is amplified by a conventional amplifier 25 and is transmitted to a conventional A.C.-D.C. converter 26 which, as previously set forth, consists of a full wave bridge rectifier followed by a four-stage L/C filter driving a dual cathode follower. The A.C.-D.C. converter 26 provides the output signal illustrated in FIG. 2 as the resultant D.C. sweep signal applied to the receiver coil is swept through its range, and the output signal is transmitted (1) to the air gap reject circuit 27 (FIGS. 3 and 9), (2) to the efficiency-obstruction-freezer test circuit 28 (FIGS. 3 and 10), and (3) to the peak detector circuit 29 (FIGS. 3 and 11).

The air gap reject circuit 27 is illustrated in detail in FIG. 9 and is provided to detect the peak db output level of the receiver output during the first, or gulp, cycle of operation of the stabilizing circuit 10. After the previously mentioned microswitch 60 has responded to operation of the motor 15 to move the contact arm of the switch 60 (FIG. 6) into engagement with its normally open contact 60A, a negative signal is transmitted through terminal C (FIG. 6), terminal C (FIG. 15), terminal C" (FIG. 15), and terminal C" (FIG. 9) to one side of a start gulp relay 85 to cause operation thereof since the other side is connected to a positive potential.

In response to operation of the start gulp relay 85, the contact arm thereof is moved into engagement with the normally open contacts 85B so that a 180 volt D.C. signal is applied to the plate circuit of a thyratron 86 from a 180 volt D.C. source 88. The output of the A.C.-D.C. converter is transmitted to the grid of the thyratron 86 through a conventional amplifier 87, and the circuit parameters are so selected that the A.C.-D.C. converter output signal peak must reach a level corresponding to a 72DB receiver output level to cause the thyratron 86 to conduct. In response to the conduction of the thyratron 86, a control relay 90 connected in the plate circuit of the thyratron 86 operates to move its contact arm out of engagement with its normally closed contacts 90A so that a negative signal is no longer transmitted through the contact arm to terminal O' and to the normally open contacts 91B of a finish gulp relay 91.

When the contact arm of the control relay 90 is in engagement with its normally closed contacts 90A, a negative signal is transmitted through terminal O' (FIG. 9) and terminal O' (FIG. 12) to one side of an SR1 relay 89 to cause operation thereof since the other end is connected to a positive potential. The SR1 relay 89 operates to prevent further operation of the stabilizing circuit 10 in the manner described below. When the control relay 90 operates to move its contact arm out of engagement with its normally closed contacts 90A, the negative signal is no longer transmitted to the SR1 relay 89, and therefore, operation of the SR1 relay 89 is prevented in the manner described below.

A negative signal is transmitted from the source 51 (FIG. 6) through the normally closed contacts 60A of the switch 60, the normally closed contacts 92A of a resetting E/P switch 92, terminal F (FIG. 6), terminal F (FIG. 15), the normally open contact 93B of a start gulp relay 93, terminal U (FIG. 15), and terminal U (FIG. 9) to one side of the finish gulp relay 91. Since a positive signal is applied to the other side of the finish gulp relay 91, the finish gulp relay operates to move its contact arm into engagement with its normally open contacts 91A if the contact arm of the start gulp relay 93 (FIG. 15) is in engagement with the normally open contacts 93B and if the contact arm of the switch 60 (FIG. 6) is in engagement with the normally closed contact 60A.

A negative signal is transmitted from the battery source 51 (FIG. 6) to the start gulp relay 93 (FIG. 15) through the normally open contact 60A of the switch 60 (FIG. 6), terminal C (FIG. 6), and terminal C (FIG. 15). The negative signal is also applied to a start gulp relay 95 (FIG. 15) which when operated moves its contact arm into engagement with its normally open contact 95B. Accordingly, the negative signal is also transmitted to the start gulp relays 93 and 95 through the normally closed contact 92B of the E/P switch 92, terminal H (FIG. 6), and terminal H (FIG. 15), whereby the start gulp relays 93 and 95 are locked in and are not affected when the contact arm of the switch 60 is moved out of engagement with the normally open contact 60B and into engagement with the normally closed contact 60A.

At the completion of the first cycle of operation of the stabilizing circuit 10, the clutch coil 57 is deenergized by means of the previously mentioned microswitch, and the contact arm of the switch 60 is moved out of engagement with the normally open contact 60B and into engagement with the normally closed contact 60A. Thus, at the completion of the first or gulp cycle of operation, the finish gulp relay 91 is operated to move its contact arm into engagement with its normally open contact 91B so that an indicator light 97 is lit up if the relay has not been energized in response to the application of the amplified A.C.-D.C. converter output signal to the thyratron 86. If the indicator light 97 is lit up, it indicates that the receiver output did not reach the 72 db level, and therefore, a large air gap condition exists in the receiver.

If the receiver does not pass the air gap reject test, it is removed from the stabilizing circuit 10 and a new receiver is placed therein to be tested and stabilized. If the receiver passes the air gap reject test, automatic operation of the stabilizing circuit 10 is continued.

The efficiency-obstruction-freezer test circuit 28 is illustrated in detail in FIG. 10. As previously set forth, this circuit is provided to test the receiver (1) for a freezer condition, (2) for a low efficiency output condition, and (3) for obstruction condition. Since the low efficiency test and the obstruction test are not performed until a receiver is stabilized, the operations thereof will not be described until the complete operation of the stabilizing circuit 10 has been described. The operation of the freezer test is set forth below.

The A.C.-D.C. converter output signal is transmitted through a conventional amplifier 100 to the grid of a conventional thyratron 101 to cause conduction of the thyratron 101 if a receiver output is provided. If the diaphragm of the receiver 11 is in engagement with the pole pieces thereof, a receiver output is not provided, and therefore, an A.C.-D.C. converter output signal is not provided to cause the thyratron 101 to conduct. When the thyratron 101 conducts, the previously mentioned freezer relay 53 operates to move its contact arm out of engagement with its normally closed contacts 53A and into engagement with its normally open contacts 53B so that terminal B″ is disconnected from terminal A′ and is connected to terminal B′.

Referring to FIG. 7, when terminal B″ is connected to terminal B′ and the open coil relay 52 has not been operated, a negative signal is transmitted from the source 51 (FIG. 6) through the normally open contact 60B of the switch 60, terminal D (FIG. 7), the normally closed contact 52A of the open coil relay 52, and the connection between terminals B″ and B′ to one side of a continue operation indicator light 104 which lights up since the other side thereof is connected to the positive terminal of the 150 volt D.C. source 82. If the freezer relay 53 is not operated, terminal B″ is connected to terminal A′ and the negative signal is transmitted from the source 51 (FIG. 6) through the normally open contact 60B of the switch 60, terminal D (FIG. 6), terminal D (FIG. 7) the normally closed contact 52A of the open coil relay 52, and the connection between terminals B″ and A′ to one side of a freezer condition indicator light 105 which lights up since the other side thereof is connected to the positive terminal of the 150 volt D.C. source 82.

Thus, it may be seen that transmission of the negative signal to terminal B′ (FIG. 7) is dependent upon the receiver 11 passing the open circuit coil test and the freezer output test, with the result that operation of the indicator light 104 is also dependent upon these tests. Terminal B′ (FIG. 7) is also connected through the run contact 54A of the check run switch 54, terminal B (FIG. 7), terminal B (FIG. 6), terminal D″ (FIG. 15), the normally closed contact 56A of the finish nibble relay 56, terminal E″ (FIG. 6) and terminal E″ (FIG. 15) to one side of the clutch coil 57, so that operation of the clutch coil, and therefore, operation of the stabilizing circuit 10 are also dependent upon the receiver 11 passing both the open coil circuit test and the freezer test.

If the receiver 11 fails to pass either the open circuit coil test or the freezer test, it is removed from the stabilizing circuit 10 and a new receiver is connected therein to be tested and stabilized. If the receiver 11 passes both the open circuit coil test and the freezer test, operation of the stabilizing circuit 10 is automatically continued.

The peak detector circuit 29 is illustrated in detail in FIG. 11 and as previously set forth is provided to indicate when a peak acoustic output level of the receiver 11 is reached. The A.C.-D.C. converter output signal is transmitted to an amplifier circuit 105 which includes a conventional D.C. amplifier 106, a suitable input network 107, and a suitable feedback network 108 so that the amplifier circuit operates as an inverting differentiator whereby the output thereof is the first derivative of the A.C.-D.C. converter output signal as illustrated in FIG. 5.

The output of the amplifier circuit 105 is transmitted to a conventional voltage senser 110 which provides a positive output signal when the amplifier circuit output signal changes from a negative value to a positive value, and the voltage sensor circuit output signal is transmitted to the grid of a conventional thyratron 111. The plate and cathode circuits of the thyratron 111 are connected to the 180 volt D.C. source 65 (FIG. 6) through terminal M (FIG. 11), terminal M (FIG. 6), and the normally open contacts 63B of the special B+ relay 63. Since the special B+ relay 63 operates during the operation of the stabilizing circuit 10 as previously set forth, the 180 volt D.C. signal is applied to the plate and cathode circuits of the thyratron 111, and the thyratron conducts in response to the application of a positive signal to its grid from the voltage senser circuit 110.

In response to conduction of the thyratron 111, a control relay 112 operates to move its contact arm into engagement with its normally open contacts 112B whereby terminal D′ is connected to terminal M′. Terminal D′ (FIG. 11) is connected through terminal D′ (FIG. 13) to the normally open contact 115B of a 10 ma. relay 115 and terminal M′ (FIG. 11) is connected through terminal M′ (FIG. 12) to one side of a down relay 116 so that the normally open contact 115B is connected to one side of the down relay 116, whereby operation of the down relay 116 is effected in the manner described below in conjunction with the operations of the coil sensing circuit 33 (FIGS. 3 and 13) and the logic circuit 32 (FIGS. 3 and 12).

The current sensing circuit 33 is illustrated in FIG. 13 and is so connected to the previously mentioned current sensing resistor 19 (which consists of three variable resistors 19A, 19B and 19C connected in series) that the current sensing circuit 33 monitors the D.C. sweep current signal provided by the scan current circuit 18 and transmitted through the current sensing resistor 19 to the coil of the receiver 11.

The resistors 19A, 19B and 19C and the current sensing circuit 33 are so associated with the scan current circuit 18 that, as the sweep current signal passes therethrough, (1) the full voltage drop across the resistors appears on the conductor 120, this conductor being connected to the top terminal of the resistor 19A as illustrated in FIG. 13 and to one output terminal of the scan current generator 66 (FIG. 8) through terminal S (FIG. 13) and terminal S (FIG. 8), (2) when the D.C. sweep current signal reaches a value of 100 ma., 20 volts is provided in the conductor 121 which is connected to the top terminal of the resistor 19B and to the tap on the resistor 19A as illustrated in FIG. 13, and (3) when the D.C. sweep current signal reaches a value of 170 ma., 20 volts is provided in the conductor 122 which is connected to the top terminal of the resistor 19C and to the tap on the resistor 19B as illustrated in FIG. 13.

The grid of a thyratron 124, which serves to indicate when the D.C. sweep current signal reaches a value of 10 ma. (+10 ma. resultant D.C. sweep current signal applied to the receiver coil), is connected to the conductor 120 through the normally closed contact 115A of the previously mentioned 10 ma. indicating relay 115. The cathode of the thyratron 124 is connected to ground through a resistor network 126 which extends between a 180 volt D.C. source 125 and ground, as shown, and the plate circuit thereof (which includes the 10 ma. indicating relay 115) is connected to the 180 volt D.C. source 65 (FIG. 6) through terminal M (FIG. 13), terminal M (FIG. 6), and the normally open contacts 63A of the special B+ relay 63 which is operated during each cycle of operation of the stabilizing circuit 10 to move its contact arm into engagement with the normally open contact 63A as explained above. The resistor network 126 is so preadjusted that, when the D.C. sweep current signal has a value of 10 ma. (−10 ma. output from the scan current circuit 18) and 10 volts is provided in the conductor 120, the thyratron 124 conducts to cause the relay 115 to operate.

When the relay 115 operates, the contact arm thereof is moved out of engagement with the normally closed contacts 115A, thereby opening the grid circuit of the thyratron 124, and into engagement with the normally open contacts 115B to complete a circuit between terminal O and terminal D′ whereby a negative signal is transmitted from the battery source 51 (FIG. 6) to one side of a down relay 116 through normally closed contacts 92B of the E/P switch 92, the normally closed contacts 64A of the special ground relay 64, terminal O (FIG. 6), terminal O (FIG. 13), normally open contacts 115B of the 10 ma. relay 115, terminal D′ (FIG. 13), terminal D′ (FIG. 11), the normally open contact 112B of the relay 112, terminal M′ (FIG. 11), and terminal M′ (FIG. 12). Thus, the down relay 116 operates as described below in conjunction with the operation of the logic circuit 32 (FIGS. 3 and 12) and the condenser storage circuit (FIGS. 3 and 14). If the E/P switch is not operated, the special ground relay 64 is not operated, the 10 ma. relay 115 is operated, and the relay 112 is operated.

The negative signal is also transmitted from one side of the down relay 116 to one side of a weak magnet indicating relay 127 and to one side of a weak magnet indicator light 128 through terminal E′ (FIG. 12), terminal E′ (FIG. 13), normally closed contact 128C of a 20 ma. indicating relay 129, terminal F′ (FIG. 13), terminal F′ (FIG. 12), the normally closed contact 130A of a continue operation relay 130, and the normally closed contact 131A of a finish gulp relay 131. The weak magnet indicator light 129 will light up and the weak magnet relay 127 will operate to prevent further operation of the stabilizing circuit 10 (indicating a weak receiver magnet) if the receiver output peak has been detected to cause relay 112 to operate before the 20 ma. relay 129 is operated to indicate a 20 ma. D.C. sweep current signal (0 ma. resultant D.C. sweep current signal).

The grid of a thyratron 133 for indicating a 20 ma. D.C. sweep current signal (0 ma. resultant D.C. sweep current signal) is also connected to the conductor 120 through the normally closed contacts 129A of the above-mentioned 20 ma. indicating relay 129. The cathode of the thyratron 133 is connected to ground through a resistor network 134 which extends between the 180 volt D.C. source 125 and ground, and the plate circuit thereof (which includes the 20 ma. indicating relay 129) is connected to the 180 volt D.C. source 65 (FIG. 6) through the same path that the plate circuit of the thyratron 124 is connected thereto. The resistor network 134 is so preadjusted that, when the D.C. sweep current signal reaches a value of 20 ma. (−20 ma. output from the scan current circuit 18) and 20 volts is provided in the conductor 120, the thyratron 133 conducts to cause the relay 129 to operate.

When the relay 129 operates, one contact arm thereof is moved out of engagement with the normally closed contacts 129A, thereby opening the grid circuit of the thyratron 133, and the other contact arm thereof is moved out of engagement with the primary contact terminals 129C and into engagement with the secondary contact terminals 129D. When the contact arm moves out of engagement with the primary contact terminals 129C, the connection between terminal F′ and terminal E′ is open circuited so that the negative signal cannot be transmitted from the one side of the down relay 116 to one side of the weak magnet relay 127 and to the weak magnet indicator light 129 as described above, and therefore, the weak magnet relay 127 and the weak magnet indicator light 129 are rendered ineffective.

When the contact arm moves into engagement with the secondary contact terminals 129D, the negative signal is transmitted from the one side of the down relay 116 to one side of a halt relay 136 and to one side of halt indicator light 137 (FIG. 12) through terminal E′ (FIG. 12), terminal E′ (FIG. 13), the normally open contacts 129D of the 20 ma. relay 129, the normally closed contacts of a 30 ma. indicating relay 138, terminal H′ (FIG. 13), and terminal H′ (FIG. 12), the other side of the halt indicator light 137 being connected to a positive potential. The halt relay and the indicator light operate to prevent operation of the stabilizing circuit 10 if a peak receiver output is detected to operate relay 112 before the 30 ma. indicating relay 138 is operated (to move its contact arm out of engagement with the primary contact terminals 138C) to indicate a 30 ma. D.C. sweep current signal (−10 ma. resultant D.C. sweep current signal). Operation of the halt relay 136 and the halt indicator light 137 indicate that the magnet of the receiver 11 is stabilized, and therefore, no demagnetization of the magnet is required.

The grid of the thyratron 140 for indicating a 30 ma. D.C. sweep current signal is connected to the conductor 120 through the normally closed contact 138A of the previously mentioned 30 ma. indicating relay 138. The cathode of the thyratron 140 is connected to ground through a resistor network 141 which extends between the 180 volt D.C. source 125 and ground, and the plate circuit thereof (which includes the 30 ma. indicating relay 138) is connected to the 180 volt D.C. source 65 (FIG. 6) through terminal M (FIG. 13), terminal M (FIG. 6), and the normally open contact 63A of the special B+ relay 63 which is operated during each cycle of operation of the stabilizing circuit 10 to move its contact arm into engagement with the normally open contact 63A. The resistor network 141 is so adjusted that when the D.C. sweep current signal reaches a value of 30 ma. (−30 ma. output from the scan current circuit 18) and 30 volts is provided in the conductor 120, the thyratron 140 conducts to cause the relay 138 to operate.

When the 30 ma. indicating relay 138 operates, a first contact arm thereof is moved out of engagement with the normally closed contacts 138A so that the 30 volts provided in the conductor 120 is no longer applied to the grid of the thyratron 140 and a second contact arm thereof is moved out of engagement with the normally closed contacts 138C and into engagement with the normally open contacts 138D to complete a circuit between terminal E′ and terminal G′ through the normally open contacts 129D of the 20 ma. indicating relay 129 and the normally open contacts 138D of the 30 ma. indicating relay 138. When a circuit is completed between terminals E′ and G′ (FIG. 13), a negative signal is transmitted from the battery source 51 (FIG. 6) through the normally closed contact 92B of the E/P switch 92, the normally closed contact 64A of the special ground relay 64, terminal O (FIG. 6), terminal O (FIG. 12), the normally open contacts 116B of the down relay 116, terminal E′ (FIG. 12), terminal E′ (FIG. 13), terminal G′ (FIG. 13), and terminal G′ (FIG. 12) to one side of the continue operation A relay 143, to one side of the continue operation B relay 130, to one side of a continue operation C relay 144, and to one side of a continue operation indicator light 145 to cause operation of the continue operation relays and the continue operation indicator light since the other sides thereof are connected to a positive potential. The continue operation relay and the continue operation indicator light operate to indicate that operation of the stabilizing circuit 10 should be continued and that a demagnetizing force should subsequently be applied to the magnet of the receiver 11.

The grid of a thyratron 150 for indicating a 100 ma. D.C. sweep current signal is connected to the conductor 121. The cathode of the thyratron 150 is connected to ground through a resistor network 149 which extends between the 180 volt D.C. source 125 and ground. The plate circuit thereof, which includes a 100 ma. indicating relay 146, is connected to the 180 volt D.C. source 65 (FIG. 6) through the normally open contact 147B of a finish gulp relay 147 (which operates at the completion of the first cycle of operation), terminal M (FIG. 13), terminal M (FIG. 6), and the normally open contact 63A of the special B+ relay 63, which is operated during each cycle of operation of the stabilizing circuit 10 to move its contact arm into engagement with the normally open contact 63A. The resistor network 149 is so adjusted that when the D.C. sweep current signal reaches 100 ma. during cycles of operation subsequent to the first cycle of operation of the stabilizing circuit 10 (−100 ma. output from the scan current circuit 18) and 20 volts is provided in the conductor 121, the thyratron 150 conducts to cause the relay 146 to operate.

When the relay 146 operates, a first contact arm thereof is moved out of engagement with the primary contact terminals 146A so that the plate circuit of the peak detector thyratron 111 (FIG. 11) is disconnected from the 180 volt D.C. source 65 (FIG. 6) and a second contact terminal thereof is moved into engagement with the normally open contacts 146D so that a negative signal is applied to one side of a 100/170 ma. control relay 148 to cause operation thereof, the other side being connected to a positive potential.

When the relay 148 operates, the contact arm thereof is moved out of engagement with the primary contact terminals 148A so that a negative signal is no longer applied through terminal J' (FIG. 13), terminal J' (FIG. 14), to a demagnetization control relay 150. The demagnetization control relay 150 is thereby deenergized, the effect of which is described below in connection with the operation of the condenser storage circuit 35 (FIGS. 3 and 14).

In response to operation of the relay 146, the negative signal is transmitted through the normally open contacts 156A, terminal I' (FIG. 13), and terminal I' (FIG. 12) to one side of the down relay 116 to provide for operation thereof if a peak acoustic receiver output has not been sensed when the D.C. sweep current signal reaches a value of 100 ma. in the successive cycles of operation of the stabilizing circuit 10 subsequent to the first cycle of operation.

A thyratron 152, for indicating a 170 ma. D.C. sweep current signal, has its grid connected to the conductor 122. The cathode of the thyratron 152 is connected to ground through a resistor network 153 which extends between the 180 volt D.C. source 125 and ground, and the plate circuit thereof which includes a 170 ma. indicating relay 154 is connected to the 180 volt D.C. source 65 (FIG. 6) through the normally closed contacts 147A of the above-mentioned finish gulp relay 147, terminal M (FIG. 13), terminal M (FIG. 6), and the normally open contacts 63A of the special B+ relay 63 which is operated during each cycle of operation of the stabilizing circuit 10 to move its contact arm into engagement with the normally open contacts 63A. The resistor network 153 is so adjusted that then the D.C. sweep current signal reaches 170 ma. during the first cycle of operation of the stabilizing circuit 10 (−170 ma. output from the scan current circuit 18) and 20 volts is provided in the conductor 122, the thyratron 152 conducts to cause the relay 154 to operate.

When the relay 154 operates, a first contact arm thereof is moved out of engagement with the primary contact terminals 154A so that the plate circuit of the peak detector thyratron 111 (FIG. 11) is disconnected from the 180 volt D.C. source 65 (FIG. 6) and a second contact arm thereof is moved into engagement with the secondary contact terminals 154D so that a negative signal is applied to one side of the 100/170 ma. control relay 148 to cause operation thereof. In response to operation of the relay 148, the contact arm thereof is moved out of engagement with the primary contact terminals 148A so that the negative signal is no longer applied to one side of the demagnetization control relay 150 as set forth above in conjunction with operation of the thyratron 144. Additionally, as set forth above in conjunction with the operation of the thyratron 144, the negative signal is applied to one side of the down relay 116 to cause operation thereof if a peak acoustic receiver output has not been detected when the D.C. sweep current signal reaches a value of 170 ma. during the first cycle of operation of the stabilizing circuit 10.

One side of the above-mentioned finish gulp relay 147 is connected to a positive potential and the other side is connected to the battery source 51 (FIG. 6) through the normally closed contact 60A of switch 60, the normally closed contact 92A of the E/P switch 92, terminal F (FIG. 6), terminal F (FIG. 15), the normally open contact 93B of the previously mentioned start gulp relay 93 which is operated at the beginning of the first cycle of operation, terminal U (FIG. 15), and terminal U (FIG. 13) so that the finish gulp relay 147 operates at the end of the first cycle of operation of the stabilizing circuit 10. The finish gulp relay 155 operates to move its contact arm into engagement with its normally open contact 155A in response to operation of the start gulp relay 93 which operates as set forth above.

The logic circuit 32 is illustrated in detail in FIG. 12 and is provided to control the charging of capacitors within the condenser storage circuit 35. The previously mentioned down relay 116 operates in response to the operation of the peak detector relay 112 (FIG. 11) when a peak receiver output is detected, or in response to operation of the 170 ma. indicating relay 154 (FIG. 13) if the D.C. sweep signal reaches a value of 170 ma. before the peak detector relay 112 is operated during the first cycle of operation of the stabilizing circuit 10, or in response to operation of the 100 ma. indicating relay 146 (FIG. 13) if the D.C. sweep signal reaches a value of 100 ma. before the peak detector relay 112 is operated during cycles of operation of the stabilizing circuit 10 subsequent to the first cycle of operation.

When the down relay 116 operates, it locks itself in and locks in the application of a negative signal to terminal E' since the negative signal is transmitted to one of the relays 116 and thus to terminal E' from the battery source 51 (FIG. 6) through the normally closed contact 92B of the E/P switch 92, the normally closed contact 64A of the special ground relay 64, terminal O (FIG. 6), terminal O (FIG. 12), and the normally open contact 116B of the relay 116. Thus at the completion of a cycle of operation of the stabilizing circuit 10 when the down relay 116 is operated, the down relay remains operated and the negative signal remains applied to terminal E' which is connected to the current sensing circuit 33 as set forth above.

When the time relay 116 is operated and the contact arm thereof is moved out of engagement with the normally closed contact 116A, a negative signal is removed from one side of the demagnetization, down control relay 57 (FIG. 14) so that it is rendered inoperative. The negative signal is otherwise applied to the one side of the demagnetization down control relay 157 from the battery source 51 through the normally closed contact 92B of the E/P switch 92, the normally closed contact 64A of the special ground relay 64, terminal O (FIG. 6), terminal O (FIG. 12), the normally closed contact 116A of the down relay 116, terminal N' (FIG. 12), and terminal N' (FIG. 14) to cause the demagnetization down control relay 157 to operate since the other side thereof is connected to a positive potential. The function of the demagnetization down control relay 157 is described below in conjunction with the operation of the condenser storage circuit 35 (FIGS. 3 and 14).

As set forth above, the weak magnet indicating relay 127 operates to stop operation of the stabilizing circuit 10 if a peak receiver output is detected when the resultant D.C. sweep signal applied to the coil of the receiver 11 aids the field of the receiver magnet. Also as previously set forth above, the gulp indicating relay 136 operates to stop operation of the stabilizing circuit 10 if a peak receiver output is detected when the resultant D.C. sweep signal applied to the receiver coil has a value which falls within the acceptance range.

The continue operation A relay 143 operates to lock itself in through its normally open contact 143B. The continue operation B relay 130 operates to prevent subsequent operation of the weak magnet relay 127 as set forth hereinabove. The continue operation C relay 144 operates to move its contact arm out of engagement with its normally closed contacts 144A so that a negative signal is removed from one side of the previously mentioned SR1 relay 89.

If the air gap reject relay 90 has also operated to indicate that the receiver 11 has passed the large air gap reject test as set forth above, another negative signal is removed from one side of the SR1 relay 89 so that the SR1 relay 89 is rendered inoperative whereby its contact arm is moved out of engagement with its normally open contact 89B. Thus, until both the air gap reject relay 90 and the control operation C relay 144 are operated, a negative signal is applied to one side of the SR1 relay 89 to cause operation thereof, the other side being connected to a positive potential. Accordingly, the contact arm thereof is in engagement with the normally open contact 89B whereby a negative signal is applied to one side of an SR1A relay 158 to cause operation thereof, the other side being connected to a positive potential.

When the SR1A relay 158 operates, (1) a first contact arm thereof is moved out of engagement with a normally closed contact 158A and into engagement with a normally open contact 158B so that a negative signal is removed from and a positive signal is applied to terminal S' which is connected to the demagnetization control circuit 50 to effect operation thereof as set forth below and (2) a second contact arm is moved into engagement with a normally open contact 158C so that a negative signal is applied to one side of an SR2 relay 160 to cause operation thereof, the other side being connected to a positive potential.

When the SR2 relay operates, a contact arm thereof is moved out of engagement with a primary contact 160A and into engagement with a secondary contact 160B. A negative signal transmitted from the battery source 51 (FIG. 6) through the normally closed contact 92B of the E/P switch 92 and terminal H (FIG. 6) to terminal H (FIG. 12) is removed from terminal 160A, which is connected through a normally closed contact in the switching circuit 37 to one side of the clutch coil 57, and is applied through terminal 160B to terminal P', which is connected to the condenser storage circuit 35 to effect operation thereof as set forth below.

The finish gulp relay 131 is provided to prevent operation of the weak magnet relay 127 subsequent to the first cycle of operation of the stabilizing circuit 10 as set forth above.

The condenser storage circuit 35 is illustrated in FIG. 14 and is provided to store a charge therein which is proportional to the voltage drop across one of the charging resistors 20 or 21 (FIGS. 3 and 8) when a peak receiver output is detected. The switching circuit 37 is illustrated in FIG. 15 and is provided to control operation of the condenser storage circuit 35. Since operations of the condenser storage circuit 35 and switching circuit 37 are so closely related, the operations thereof will be discussed together.

During the first cycle of operation of the stabilizing circuit 10, a charge is stored in a gulp charging capacitor G1 which charge is proportional to the instantaneous voltage drop across the gulp charging resistor 20 (FIG. 8) as the D.C. sweep signal provided by the scan current generator 66 (FIG. 8) is transmitted therethrough. The gulp charging capacitor G1 is connected across the gulp charging resistor 20 through the normally open contact 161B of a gulp control relay 161, the normally open contact 157B of the previously mentioned demagnetization down control relay 157, the normally open contact 150B of the previously mentioned demagnetization 100/170 control relay 150, terminal T (FIG. 14), terminal T (FIG. 8), and the normally closed contact 76A of the previously mentioned finish gulp relay 76.

As previously set forth, the demagnetization 100/170 relay 150 is operated to maintain its contact arm in engagement with the normally open contact 150B unless the D.C. sweep signal reaches a value of 170 ma. during the first cycle of operation of the stabilizing circuit 10 before a peak receiver output is detected by the peak detector circuit 29 and the demagnetization down control relay 157 is operated to maintain its contact arm in engagement with the normally open contact 157B unless the down relay 116 (FIG. 12) is operated. One side of the gulp control relay 161 is connected to a positive potential and a negative signal is applied to the other side from the battery source 51 (FIG. 6) through the normally open contact 60B of the switch 60, terminal C (FIG. 6), terminal C (FIG. 14), and the normally closed contact 162A of a finish gulp relay 162 so that the gulp control relay 161 operates during the first cycle of operation of the stabilizing circuit 10.

One side of the finish gulp relay 162 is connected to a positive potential and a negative signal is applied to the other side from the battery source 51 (FIG. 6) through the normally closed contact 60A of the switch 60, the normally closed contact 92A of the E/P switch 92, terminal F (FIG. 6), terminal F (FIG. 15), the normally open contact 93B of the previously mentioned start gulp relay 93, which is operated at the beginning of the first cycle of operation, terminal U (FIG. 15) and terminal U (FIG. 14) so that the finish gulp relay 162 operates at the completion of the first cycle of operation of the stabilizing circuit 10 when the contact arm of the switch 60 is moved into engagement with the normally closed contact 60A. When the finish gulp relay 162 operates, the gulp control relay 161 is rendered inoperative during subsequent cycles of operation, since the contact arm of the finish gulp relay 162 is moved out of engagement with the primary contacts 162A, and a nibble control relay 165 is conditioned for operation during subsequent cycles of operation since the contact arm of the finish gulp relay 162 is moved into engagement with the normally open contact 165B.

The final charge stored in the gulp storage condenser G1 is proportional to either the voltage drop across the gulp charging resistor 20 when a peak receiver output is detected or the voltage drop across the gulp charging resistor 21 when the D.C. sweep signal reaches a value of 170 ma. before a peak receiver output is detected. The gulp storage condenser G1 is connected across the input of a gulp electrometer 164 so that the stored charge is applied to the electrometer 164. In response to the application of the stored charge thereto, the gulp electrometer 164 provides an output signal which has a value proportional to the amount of charge stored in the gulp storage condenser G1 which is applied through terminal V' to the demagnetization control circuit 40 to effect operation thereof as set forth below. However, a charge is not stored in the gulp storage condenser G1 and transmitted to the gulp electrometer 164 unless the continue operation C relay 144 (FIG. 12) has operated to indicate that demagnetization is required.

During cycles of operation of the stabilizing circuit 10 subsequent to the first cycle, a charge is stored in a nibble charging circuit 166, which charge is proportional to the instantaneous voltage drop across the nibble charging resistor (FIGS. 3 and 8) as the D.C. sweep signal provided by the scan current generator 66 (FIG. 8) is transmitted therethrough. The nibble charging circuit 166 is connected across the nibble charging resistor 21 through the normally open contact 165B of the nibble control relay 165, the normally open contact 157B of the demagnetization down control relay 157, the normally open contact 150B of the demagnetization 100/170 control relay 150, terminal T (FIG. 14), terminal T (FIG. 8), and the normally open contact 76B of the finish gulp relay 76, which operates at the completion of the first cycle of operation of the stabilizing circuit 10. As previously set forth, the demagnetization 100/170 relay 150 is operated to maintain its contact arm in engagement with the normally open contact 150B unless the D.C. sweep signal reaches a value of 100 ma. during cycles of operation subsequent to the first cycle before a peak receiver output is detected by the peak detector circuit 29, and the demagnetization down control relay 157 is operated to maintain its contact arm in engagement with the normally open contact 157B unless the down relay 116 (FIG. 12) is operated.

The nibble charging circuit 166 includes five nibble charging capacitors N1–N5 which may be selectively connected across the nibble charging resistor 21 so that the stabilizing circuit 10 may be operated for five nibble demagnetization cycles subsequent to a gulp demagnetization cycle. The nibble charging circuit 166 also includes a cancellation circuit 168 which provides a charging voltage of opposite polarity to the voltage developed across the nibble charging resistor 121 so that no charge is stored in the nibble charging capacitors N1–N5 when the D.C. sweep signal transmitted from the scan current generator 66 (FIG. 8) varies between the values of 0 ma. and 30 ma.

Referring to FIG. 15, at the beginning of the first cycle of operation of the stabilizing circuit 10, the start gulp relay 95 and the start gulp relay 93 are operated and are locked in through terminal H as previously set forth. At the completion of the first cycle of operation, finish gulp relays 170, 171 and 172 are operated since one side of each relay is connected to a positive potential and a negative signal is applied to the other side of each relay from the battery source 51 (FIG. 6) through the normally closed contact 60A of the switch 60, the normally closed contact 92A of the E/P switch 92, terminal F (FIG. 6), terminal F (FIG. 15), and the normally open contact 93B of the start gulp relay 93.

When the finish gulp relay 170 operates, it locks itself in since the negative signal is applied to one side thereof from the battery source 51 through the normally closed contact 92B of the E/P switch 92, terminal H (FIG. 6), terminal H (FIG. 15), and its own normally open contact 170B. When the finish gulp relay 171 operates, it conditions a start nibble relay 173 for operation during the second cycle of operation of the stabilizing circuit 10 (first nibble cycle), since one side of the start nibble relay 173 is connected to a positive potential, and a negative signal is applied to the other side from terminal C through the normally open contact 171B of the first gulp relay 171. When the finish gulp relay 172 operates, terminal L is connected to terminal X' so that during the second cycle of operation of the stabilizing circuit 10, a negative signal is applied to a nibble charge A control relay 175 and a nibble charge A' control relay 176 (FIG. 14) from the battery source 51 (FIG. 6) through the normally closed contact 92B of the E/P switch 92, the normally open contact 64B of the special ground relay 64, terminal L (FIG. 6), terminal L (FIG. 15), normally open contact 172B of the finish gulp relay 172, terminal X' (FIG. 15), and terminal X' (FIG. 14) to cause operation of the nibble charge control relays 175 and 176, the other sides thereof being connected to a positive potential.

When the nibble charge A' control relay 176 operates, (1) a first contact arm thereof is moved into engagement with a normally open contact 176A to lock in the control relay 176 through terminal C (FIG. 14), terminal C (FIG. 6), and the normally open contact 60B of the switch 60, and (2) a second contact arm is moved into engagement with a normally open contact 176B in the nibble charging circuit 166. When the nibble charge A control relay 175 operates, (1) a first contact arm is moved into engagement with a normally open contact 175 to lock in relay 175 through terminal P' (FIG. 14), terminal P' (FIG. 12), terminal C (FIG. 12), terminal C (FIG. 6), and the normally open contact 60B of the switch 60 and through terminal P' (FIG. 12), the normally open contact 160B of the SR2 relay 160, terminal H (FIG. 12), terminal H (FIG. 6), and the normally closed contact 92B of the E/P switch 92. The SR relays 89, 158 and 160 (FIG. 12) are slow releasing relays so that the A control relay 175 releases a time period after the A' control relay 176 releases in response to operation of the continue operation relay 144 (FIG. 12).

During the second cycle of operation of the stabilizing circuit 10, a charge is stored in the nibble charging capacitor N1 which charge is proportional to the instantaneous voltage drop across the nibble charging resistor 21 as the D.C. sweep signal is transmitted therethrough. The capacitor N1 is connected across the resistor 21 through the normally open contact 175B of the A control relay 175, the normally open contact 165B of the nibble control relay 165, the normally open contact 157B of the demagnetization down control relay 157B of the demagnetization 100/170 control relay 150, terminal T (FIG. 14), terminal T (FIG. 8), and the normally open contact 76B of the finish gulp relay 76 and through the normally open contact 176B of the A' control relay 176, the cancellation circuit 168, and the normally open contact 180B of a charge/use control relay 180. The charge/use control relay 180 is operated during each cycle of operation of the stabilizing circuit 10 since one side is connected to a positive potential and a negative signal is applied to the other side from terminal C.

When a peak receiver output is detected or the D.C. sweep signal reaches a value of 100 ma. before the peak output is detected, the capacitor N1 is removed from across the nibble charging resistor 21 and is connected across a nibble electrometer 181 at the end of the cycle through the normally closed contacts 180A and 180C of the charge/use control relay 180 and the normally open contact 175B of the A control relay 175. The charge stored in the nibble storing capacitor N1 is applied to the nibble electrometer 181 so that an output is provided thereby which has a value proportional to the stored charge, and the output signal is applied through terminal W' to the demagnetization control circuit 40 to effect operation thereof as set forth hereinafter. However, a charge is not stored and transmitted to the electrometer 181 unless the continue operation C relay 144 (FIG. 12) has operated to indicate that demagnetization is required.

At the end of the second cycle of operation of the stabilizing circuit 10, finish nibble relays 183, 184 and 185 are operated. The finish nibble relay 183 locks itself in through terminal H. The finish nibble relay 184 conditions start nibble relays 186 and 187 for operation during the third cycle of operation of the stabilizing circuit (second nibble cycle). The finish nibble relay 185 conditions a nibble charge B relay 187 and a nibble charge B' relay 188 (FIG. 14) for operation during the third cycle of operation of the stabilizing circuit 10 (similar to operation of control relays 175 and 176 during the second cycle of operation).

At the beginning of the third cycle of operation of the stabilizing circuit 10, the start nibble relays 186 and 187 operate and the control relays 187 and 188 also operate. The start nibble relay 186 locks itself in and the start nibble relay 187 conditions finish nibble relays 189, 190 and 191 for operation. The control relays 186 and 187 connect the charging capacitor into across the charging resistor 21 so that during the third cycle of operation, a charge is stored therein which is proportional to the instantaneous voltage drop across the charging resistor 21 as the D.C. sweep signal is transmitted therethrough. At the end of the third cycle of operation, the nibble charging capacitors N1 and N2 are connected in series across the nibble electrometer 181 so that an output signal is transmitted to the condenser storage circuit through terminal W' which has a value proportional to the summation of the charge stored in the capacitor N1 during the second cycle of operation and the capacitor N2 during the third cycle of operation.

During subsequent cycles of operation of the stabilizing circuit 10, the switching circuit 37 (FIG. 15) continues to step along as set forth above so that (1) at the beginning of the fourth cycle, the nibble charging capacitor N3 is connected across the nibble charging resistor 21 and at the end of the fourth cycle, the capacitors N1, N2 and N3 are connected in series across the nibble electrometer 181, (2) at the beginning of the fifth cycle, the nibble charging capacitor N4 is connected across the nibble charging resistor 21 and at the end of the fifth cycle, the capacitors N1–N4 are connected in series across the nibble electrometer 181, and (3) at the beginning of the sixth cycle of operation, the nibble charging capacitor N5 is connected across the nibble charging resistor 21 and at the completion of the sixth cycle, the capacitors N1–N5 are connected in series across the nibble electrometer 181.

The demagnetization control circuit 40 is illustrated in detail in FIG. 16 and is provided to control the demagnetization of the magnet of the receiver 11. The output signal provided by the gulp electrometer 164 (FIG. 14) is transmitted through terminal V' (FIG. 14) and terminal V' (FIG. 16) to one side of a dual triode 210, and the output signal provided by the nibble electrometer 181 (FIG. 14) is transmitted through terminal W' (FIG. 14) and W' (FIG. 16) to the other grid of the dual triode 210.

Both cathodes of the dual triode 210 are connected to ground and the plate circuits thereof are connected to a pair of primary windings of a multiwinding saturable reactor 211 so that the secondary output of the saturable reactor is under the control of the two outputs of the dual triode, which in turn are controlled by the amount of charge stored in the gulp and nibble capacitors (FIG. 14). A third primary winding of the saturable reactor 211 is biased by a conventional power supply to provide a 10-volt D.C. reactor output.

The secondary output of the saturable reactor 211 is transmitted to a full wave bridge rectifier circuit 212 and the output of the full wave bridge rectifier circuit 212 is connected to the previously mentioned power condenser through the normally open contact 213B of a control relay 213. When the control relay 213 is operated, a charge proportional to the output of the full wave bridge rectifier circuit (proportional to the charge stored in the gulp and nibble capacitors of the condenser storage circuit) is stored in the power condenser 41. One side of the control relay 213 is connected to a negative potential, and a positive signal is applied to the other side through the normally open contact 158D of the previously mentioned SR1A relay 158 (operated during each cycle of operation), terminal S' (FIG. 12), and terminal S' (FIG. 16) to cause operation of the control relay 213 during each cycle of operation. A meter 214 is connected across the power condenser 41 to indicate the amount of charge stored in the power condenser 41.

The power condenser 41 is connected across the demagnetization coil 43 (associated with the magnet of the receiver 11) through the normally open contact 225B of a mercury plunger type control relay 225 which is pulse operated through 500 microfarads (mf.) condenser 226 connected in series with the control relay 225. One side of the control relay 225-condenser 226 series arrangement is connected to a positive potential through terminal A" (FIG. 16) terminal A" (FIG. 12) and the other side thereof is connected to a minus potential through terminal S' (FIG. 16), terminal S' (FIG. 12), and the normally closed contact 158C of the SR1A relay 158 which is released at the end of each cycle of operation so that (1) the control relay 225 is operated and (2) the condenser 226 charges toward the potential connected across the control relay 225-condenser 226 series arrangement.

When the mercury plunger type control relay 225 is operated, its contact arm is moved into engagement with the secondary contact terminal 22B so that the power condenser 41 is connected across the demagnetization coil 43 at the end of the cycle of operation and the power condenser 41 discharges through the demagnetization coil 43, whereby the magnet of the receiver 11 is demagnetized in proportion to the charge stored in the gulp and/or nibble capacitors. The condenser 226 is provided to minimize current surges in the relay power supply and is discharged when the SR1A relay 158 is operated.

If the receiver 11 has passed the freezer test, large air gap test, and weak magnet test and the D.C. sweep signal does not fall within the acceptance range when a peak receiver output is detected, the stabilizing circuit 10 is cyclically operated to demagnetize the magnet of the receiver 11 until the D.C. sweep signal falls within the acceptance range when the peak receiver output is detected as indicated by operation of the halt relay (FIG. 12). However, the stabilizing circuit 10 is operated a maximum of six cycles (one gulp cycle and five nibble cycles) as set forth above.

When the magnet of a receiver 11 has been stabilized, the receiver is then tested for low efficiency and for an obstruction by operation of the previously mentioned efficiency-obstruction-freezer test circuit 28 (FIGS. 3 and 10).

Referring to FIG. 10 an SR1 relay 230 is operated when the halt operation relay 136 (FIG. 12) is operated since one side is connected to a positive potential and since the negative signal that is applied to the halt relay 136 through terminal H' to cause operation thereof is applied to the other side of the SR1 relay 230 through terminal P (FIG. 12), terminal P (FIG. 6), the normally open contacts 62B of the cam B relay 62, which is operated during each cycle of operation of the stabilizing circuit 10, terminal J (FIG. 6) and terminal J (FIG. 10).

When the SR1 relay 230 is operated, the previously mentioned SR2 relay 84 is conditioned for operation since one side is connected to a positive potential and since the negative signal applied to the halt relay 136 is applied to the other side of the SR2 relay 84 through terminal P (FIG. 12), terminal P (FIG. 6), the normally closed contact 62A of the cam B relay 62, which is rendered inoperative at the end of each cycle of operation, terminal K (FIG. 6) and terminal K (FIG. 10). The SR1 relay 230 is a slow releasing relay so that the SR2 relay 84 operates at the completion of a cycle of operation before the SR1 relay 230 releases.

When the SR2 relay 84 operates, it locks itself in to the battery source 51 (FIG. 6) through the normally open contact 84A, terminal H (FIG. 10), terminal H (FIG. 6), and the normally closed contact 92B of the E/P switch 92. When the SR2 relay 84 operates, it also connects the 120 volt 60 c.p.s. source 232 across the plate and cathode circuits of a "low efficiency" thyratron 233 through its normally open contact 84E and the normally closed contacts 230B of the SR1 relay 230.

The output from the A.C.-D.C. converter 26 (FIG. 3) is amplified by an amplifier 234 and is transmitted to the grid of the thyratron 233 to cause the thyratron to conduct if the receiver output meets the prescribed output requirements when the D.C. sweep signal returns to a 0 value at the completion of the cycle of operation. When the thyratron 233 conducts, a first "low efficiency" relay 235 is operated to move its contact arm into engagement with a normally open contact 235B whereby a second "low efficiency" relay 236 is operated. When the second low efficiency relay 236 is operated, its contact arm is moved out of engagement with its normally closed contact 236A so that a "low efficiency" indicator light 238 is open circuited and into engagement with its normally open contact 236B so that the negative signal which locks in the SR2 relay 84 is transmitted to one side of the previously mentioned sweep dirt check relay 67 and to one side of a pair of previously mentioned reverse D.C. relays 70 and 78 (FIG. 8) through the normally open contact 236B of the low efficiency relay 236, terminal Q (FIG. 10), and terminal Q (FIG. 8). If the thyratron 233 does not conduct when the amplified A.C.-D.C. converter output is applied to its grid, the low efficiency relays 235 and 236 are not operated, and the negative signal which locks in the SR2 relay 84 is transmitted to the "low efficiency" indicator light 238 to cause operation thereof which indicates a "low efficiency" receiver that is to be rejected.

Referring to FIG. 8, when the negative signal is transmitted to one side of the sweep dirt check relay 67 and the reverse D.C. relays 70 and 78, the relays 67, 70 and 78 operate since the other sides thereof are connected to a positive potential. When the reverse D.C. relays 70 and 78 are operated, the direction in which the D.C. sweep signal is provided by the scan current generator 66 flows through the receiver coil is reversed. When the sweep dirt check relay 67 operates, a normally closed contact 67B is opened so that the potentiometer 16 is removed from across the input to the scan current generator 66, and a normally open contact 67C is closed so that a 50,000 ohm resistor 240 and a 175,000 ohm resistor 241 are connected in series across the input to the scan current generator 66, whereby a +225 ma. D.C. signal is applied to the receiver coil (aiding the field of the receiver magnet). When the sweep dirt check relay 67 operates, it also opens the normally closed contact 67A so that a negative signal is removed from one side of a control relay 242 to render the control relay 242, which is a slow releasing relay, inoperative.

When the control relay 242 is rendered inoperative, a normally closed contact 242A is closed so that the 50,000 ohm resistor 240 is shorted out and only the 175,000 ohm resistor 241 is connected across the input to the scan current generator 66, whereby the D.C. signal applied to the receiver coil is dropped to a value of +175 ma. (aiding). Also, when the control relay 242 is rendered inoperative, a normally open contact 242B is opened so that a negative signal is removed from one side of an SR3 relay 244 to render the SR3 relay inoperative.

When the SR3 relay 244 is rendered inoperative, the 120-volt 60 c.p.s source 232 is connected across the plate and cathode circuits of an obstruction thyratron 245 to condition the thyratron 245 for operation. The A.C.-D.C. converter output is amplified by an amplifier 246 and is transmitted to the grid of the thyratron 245. When the aiding D.C. signal applied to the receiver coil has a value of +225 ma., the receiver diaphragm should be frozen and no output should be provided thereby and, when the D.C. signal is reduced to a value of +175 ma., the receiver should provide an output such that the A.C.-D.C. converter 26 produces an output which is transmitted to the grid of the thyratron 245 to cause the thyratron 245 to conduct.

When the thyratron 245 conducts, an obstruction relay 246 operates to move its contact arm into engagement with a normally open contact 246B so that an okay indicator light 247 operates, one side being connected to a positive potential, and a negative signal being applied to the other side from the battery source 51 (FIG. 6) through the normally closed contact 92B of the E/P switch 92, terminal H (FIG. 6), terminal H (FIG. 10), the normally closed contact 244B of the SR3 relay 244 and the normally open contact 246B of the obstruction relay 246. If no receiver output is provided as the D.C. signal applied to the receiver coil is reduced from +225 ma. to +175 ma., the thyratron 245 does not operate, the obstruction relay 246 does not operate, and the contact arm of the obstruction relay 246 remains in engagement with the normally closed contact 246A so that an obstruction indicator light 248 is operated rather than the okay indicator light 247.

At the completion of the obstruction test, the receiver 11 is removed from the stabilizing circuit 10. The E/P switch 92 (FIG. 6) is then operated so that the negative signal is removed from terminals F and H whereby the previously locked in relays in the stabilizing circuit are rendered inoperative and the gulp and nibble capacitors in the condenser storage circuit 35 are discharged. The stabilizing circuit 10 is then ready for another testing and stabilizing operation and a new receiver is connected therein.

A method and apparatus have now been described which accomplish the various objectives set forth above. The illustrated embodiment of the invention is particularly applicable to the testing of acoustic devices. It will be apparent, however, that the invention is applicable to the testing of various electromagnetic devices employing a permanent magnet and producing some form of output in response to the application of an A.C. signal thereto.

While it is generally preferred to over-magnetize the permanent magnet of such an electromagnetic device and then selectively remagnetize the magnet to bring it to optimum strength, where accurate control of magnet strength warrants adjustment of the magnet within the device, it will be apparent htat the present invention is readily adapted to weakening and/of strengthening of a magnet field to bring it to optimum field strength.

Where it is desired that the strength of the magnet be altered only in one direction, e.g. demagnetized, the demagnetizing force, while governed by the magnitude of the value of the D.C. test signal corresponding to maximum output of the device, is preferably of substantially smaller magnitude than that which calculation would show to be the value required to completely stabilize the magnet. In such case the operation is preferably repeated until the magnet is properly stabilized. Alternatively, however, the demagnetizing force may be made substantially equal to the calculated demagnetizing force required to completely stabilize the magnet, as governed by the strength of the D.C. signal.

Accordingly, while one specific embodiment of the invention has been described in detail, it will be obvious that various modifications may be made from the specific details described without departing from the spirit and scope of the invention.

What is claimed is:

1. The method of stabilizing a magnet of an electromagnetic device, which comprises the steps of:
    subjecting the magnet to an alternating electromagnetic field to cause the device to produce an output signal;
    concurrently subjecting the magnet to a D.C. induced electromagnetic field and varying the D.C. induced field through a predetermined range of field strength to vary the output signal;
    monitoring the output signal to determine when the output signal attains a maximum value;
    recording the field strength of the D.C. induced electromagnetic field corresponding to the maximum value of the output signal; and
    subjecting the magnet to a magnetization altering force whose magnitude is governed by the recorded field strength of the D.C. induced field.

2. The method of stabilizing a magnet of an electromagnetic device as specified in claim 1 wherein:
    the magnitude of the magntization altering force is made less than a predicted value for complete stabilization of the magnet; and
    the foregoing steps are repeated until the field strength of the D.C. induced electromagnetic field which is required to produce maximum output signal of the device is sufficiently small that it falls within desired limits.

3. The method of stabilizing a magnet of an electromagnetic device wherein the magnet is of greater strength than that required for optimum performance of the device, which comprises the steps of:
    subjecting the magnet to an alternating electromagnetic field to cause the device to produce an ouput signal;
    concurrently subjecting the magnet to an opposing D.C. induced electromagnetic field and varying the D.C. induced field through a predetermined range of field strength to vary the output signal;
    monitoring the output signal to determine when the output signal attains a maximum value;
    recording the field strength of the D.C. induced electromagnetic field corresponding to the maximum value of the output signal; and
    subjecting the magnet to a demagnetizing force whose magnitude is governed by the recorded field strength of the D.C. induced field.

4. The method of stabilizing a saturated magnet of an electromagnetic device as specified in claim 3 wherein:
the magnitude of the demagnetizing force is made less than a predicted value for complete stabilization of the magnet; and
the foregoing steps are repeated until the field strength of the D.C. induced electromagnetic field which is required to produce maximum output signal of the device is sufficiently small that it falls within desired limits.

5. The method of stabilizing a magnet of an electromagnetic device wherein the magnet is of greater strength than that required for optimum performance of the device, which method comprises the steps of:
subjecting the device to an A.C. signal of predetermined frequency and magnitude to cause the device to produce an output signal;
simultaneously subjecting the device to a D.C. signal;
varying the value of the D.C. signal through a predetermined range to vary the output signal;
monitoring the output signal to determine when the output signal attains a maximum value;
recoding the value of the D.C. signal corresponding to the maximum value of the output signal; and
subjecting the magnet to a demagnetizing force whose magnitude is governed by the recorded value of the D.C. signal.

6. Apparatus for stabilizing a magnet of an electromagnetic device wherein the magnet is of greater strength than that required for optimum performance of the device, said apparatus comprising:
an A.C. signal source for applying an A.C. signal of predetermined frequency and magnitude to the device to produce an output signal;
a D.C. signal source for concurrently applying a D.C. signal of value variable through a predetermined range to the device to vary the value of the output signal of the device;
means for monitoring the output signal of the device to determine when the output signal attains a maximum value;
means responsive to the D.C. signal and to said monitoring means for recording the value of the D.C. signal corresponding to the maximum value of the output signal;
means for subjecting the magnet to a demagnetizing force; and
control means associated with said demagnetizing means and said recording means for governing the magnitude of the demagnetizing force in accordance with the recorded value of the D.C. signal.

7. Apparatus for stabilizing a magnet as specified in claim 6 wherein:
said recording means includes capacitor means arranged to be charged in accordance with the instantaneous value of the D.C. signal;
said monitoring means includes circuitry for interrupting the charging of said capacitor means when the output signal of the device attains a maximum value;
said demagnetizing means includes a power capacitor for storing a demagnetizing charge; and
said control means includes circuitry for charging said power capacitor in accordance with the charge on said capacitor means.

8. Apparatus for stabilizing a magnet as specified in claim 6 wherein:
said recording means includes capacitor means arranged to be charged in accordance with the instantaneous value of the D.C. signal;
said monitoring means includes circuitry for interrupting the charging of said capacitor means when the output signal of the device attains a maximum value;
said demagnetizing means includes a power capacitor for storing a demagnetizing charge;
said control means includes circuitry for charging said power capacitor in accordance with the charge on said capacitor means without substantial diminution of the charge on said capacitor means; and
said recording means includes circuitry for adding to the charge on said capacitor means in accordance with the instantaneous value of the D.C. signal during successive operations of the stabilizing apparatus, whereby said demagnetizing means may subject the magnet to successively greater demagnetizing forces in the event that the demagnetizing force applied in the last preceding operation is insufficient to stabilize the magnet within desired limits.

9. Apparatus for stabilizing a magnet as specified in claim 6 wherein said recording means includes:
a plurality of recording elements responsive to the D.C. signal and successively actuatable as the D.C. signal attains successively greater predetermined values; and
circuitry responsive to said monitoring means for preventing such actuation of said recording elements after the output signal of the device attains a maximum value.

10. Apparatus for stabilizing a magnet as specified in claim 6 wherein:
logic circuitry is provided for directing the stabilizing apparatus through repeated operations to stabilize a given magnet; and
said logic circuitry including means responsive to said recording means to interrupt operation in the event that the value of the D.C. signal corresponding to maximum value of the output signal, in any one operation, is sufficiently small that it falls within desired limits.

11. Apparatus for stabilizing a magnet as specified in claim 6 wherein:
said monitoring means includes a converter for transforming the output of the device to a differentiated D.C. output signal which passes through zero value when the output of the device passes through maximum value; and
said recording means includes circuitry for recording the value of the D.C. signal applied by said D.C. signal source when the differentiated D.C. output signal passes through zero value.

12. Apparatus for stabilizing a magnet of an electromagnetic acoustic device wherein the magnet is of greater strength than that required for maximum output of the device, said apparatus comprising:
an A.C. signal source for applying an A.C. signal of predetermined frequency and magnitude to the device to produce an acoustic output;
a D.C. signal source for concurrently applying a D.C. signal of value variable through a predetermined range to the device to vary the value of the acoustic output of the device;
means for monitoring the output of the device to determine when the output attains a maximum value;
means responsive to the D.C. signal and to said monitoring means for recording the value of the D.C. signal corresponding to the maximum value of the output;
means for subjecting the magnet to a demagnetizing force; and
control means associated with said demagnetizing means and said recording means for governing the magnitude of the demagnetizing force in accordance with the recorded value of the D.C. signal.

(References on following page)

References Cited by the Examiner

UNITED STATES PATENTS

| | | | |
|---|---|---|---|
| 2,888,641 | 5/1959 | Lord | 324—34 |
| 2,963,643 | 12/1960 | Brown | 317—157.5 XR |
| 3,068,380 | 12/1962 | Lamoreaux | 324—34 XR |

OTHER REFERENCES

Publication: IBM Technical Disclosure Bulletin, vol. 2, No. 4, December 1959, "Core Characteristics Indicator," J. L. Center et al.

SAMUEL BERNSTEIN, *Primary Examiner*.